US012655233B2

(12) United States Patent
Yamanaka et al.

(10) Patent No.: US 12,655,233 B2
(45) Date of Patent: Jun. 16, 2026

(54) FIBROUS CELLULOSE, FIBROUS CELLULOSE DISPERSION, AND FIBROUS CELLULOSE PRODUCTION METHOD

(71) Applicant: OJI HOLDINGS CORPORATION, Tokyo (JP)

(72) Inventors: Mio Yamanaka, Tokyo (JP); Takahiro Ochiai, Tokyo (JP); Akihiro Tanaka, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 719 days.

(21) Appl. No.: 17/919,921

(22) PCT Filed: Apr. 22, 2021

(86) PCT No.: PCT/JP2021/016315

§ 371 (c)(1),
(2) Date: Oct. 19, 2022

(87) PCT Pub. No.: WO2021/215502

PCT Pub. Date: Oct. 28, 2021

(65) Prior Publication Data

US 2023/0174678 A1 Jun. 8, 2023

(30) Foreign Application Priority Data

Apr. 22, 2020 (JP) ................................ 2020-075908

(51) Int. Cl.

*C08B 5/00* (2006.01)
*C08L 1/16* (2006.01)
*C09D 7/65* (2018.01)

(52) U.S. Cl.

CPC .................. *C08B 5/00* (2013.01); *C08L 1/16* (2013.01); *C09D 7/65* (2018.01); *C08L 2201/54* (2013.01)

(58) Field of Classification Search

None
See application file for complete search history.

(56) References Cited

U.S. PATENT DOCUMENTS

2015/0225550 A1 8/2015 Banzashi et al.
2016/0115249 A1 4/2016 Noguchi et al.
(Continued)

FOREIGN PATENT DOCUMENTS

CN 107630385 A 1/2018
CN 107805851 A 3/2018
(Continued)

OTHER PUBLICATIONS

WO-2017170908-A1, English translation (Year: 2017).*
(Continued)

*Primary Examiner* — Stefanie J Cohen
(74) *Attorney, Agent, or Firm* — Sughrue Mion, PLLC

(57) ABSTRACT

The present invention relates to microfibrous cellulose capable of exhibiting an excellent dispersibility stability and an excellent coating suitability when added to paint.

To this end, the present invention provides fibrous cellulose having a fiber width of 1,000 nm or less and containing an ionic substituent. An amount of the ionic substituent in the fibrous cellulose is 0.10 mmol/g or more and 1.50 mmol/g or less. A polymerization degree of the fibrous cellulose is 150 or more and 515 or less. When the fibrous cellulose is dispersed in a dispersion solvent containing water and isopropanol to obtain a dispersion fluid having a 7:3 mass ratio of water and isopropanol and a viscosity of 2,500 mPa·s at 23° C., and the dispersion fluid is stirred under predetermined stirring conditions, a viscosity change rate falls within ±50% as calculated by the following formula:

(Continued)

viscosity change rate (%)=(viscosity after stirring−viscosity before stirring)/viscosity before stirring×100 .

1 Claim, 2 Drawing Sheets

(56) References Cited

U.S. PATENT DOCUMENTS

| | | | | |
|---|---|---|---|---|
| 2019/0127915 | A1* | 5/2019 | Noguchi | D21H 11/04 |
| 2020/0002883 | A1 | 1/2020 | Zhao et al. | |
| 2021/0122932 | A1* | 4/2021 | Mizukami | C12Y 302/01004 |
| 2022/0002442 | A1 | 1/2022 | Tanaka et al. | |
| 2023/0174678 | A1 | 6/2023 | Yamanaka et al. | |

FOREIGN PATENT DOCUMENTS

| | | | | |
|---|---|---|---|---|
| CN | 110520447 | A | 11/2019 | |
| CN | 112867738 | A | 5/2021 | |
| EP | 3438132 | A1 * | 2/2019 | C08L 1/16 |
| JP | 2018-106865 | A | 7/2018 | |
| JP | 2019026651 | A * | 2/2019 | C12P 19/04 |
| JP | 2020-50736 | A | 4/2020 | |
| JP | 2020-063351 | A | 4/2020 | |
| JP | 6940008 | B2 | 9/2021 | |
| JP | 7556322 | B2 | 9/2024 | |
| JP | 7556323 | B2 | 9/2024 | |
| WO | 2017/047768 | A1 | 3/2017 | |
| WO | 2017/175468 | A1 | 10/2017 | |
| WO | WO-2017170908 | A1 * | 10/2017 | C08L 1/16 |
| WO | 2018/012014 | A1 | 1/2018 | |
| WO | 2018/159473 | A1 | 9/2018 | |
| WO | 2019/043782 | A1 | 3/2019 | |

OTHER PUBLICATIONS

JP-2019026651-A, English translation (Year: 2019).*

International Search Report of PCT/JP2021/016315 dated Jun. 15, 2021 [PCT/ISA/210].

* cited by examiner

[Fig. 1]
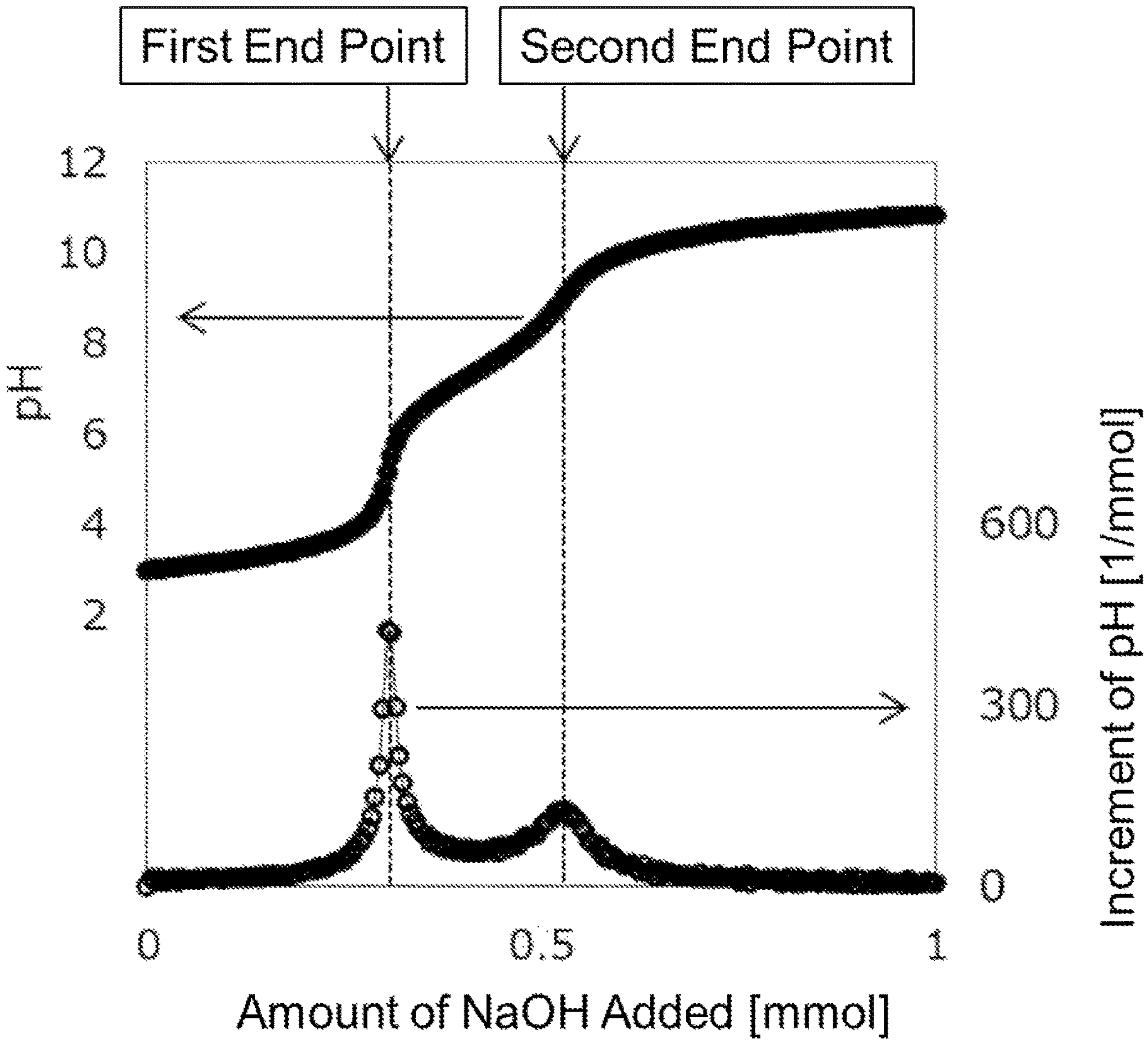

[Fig. 2]
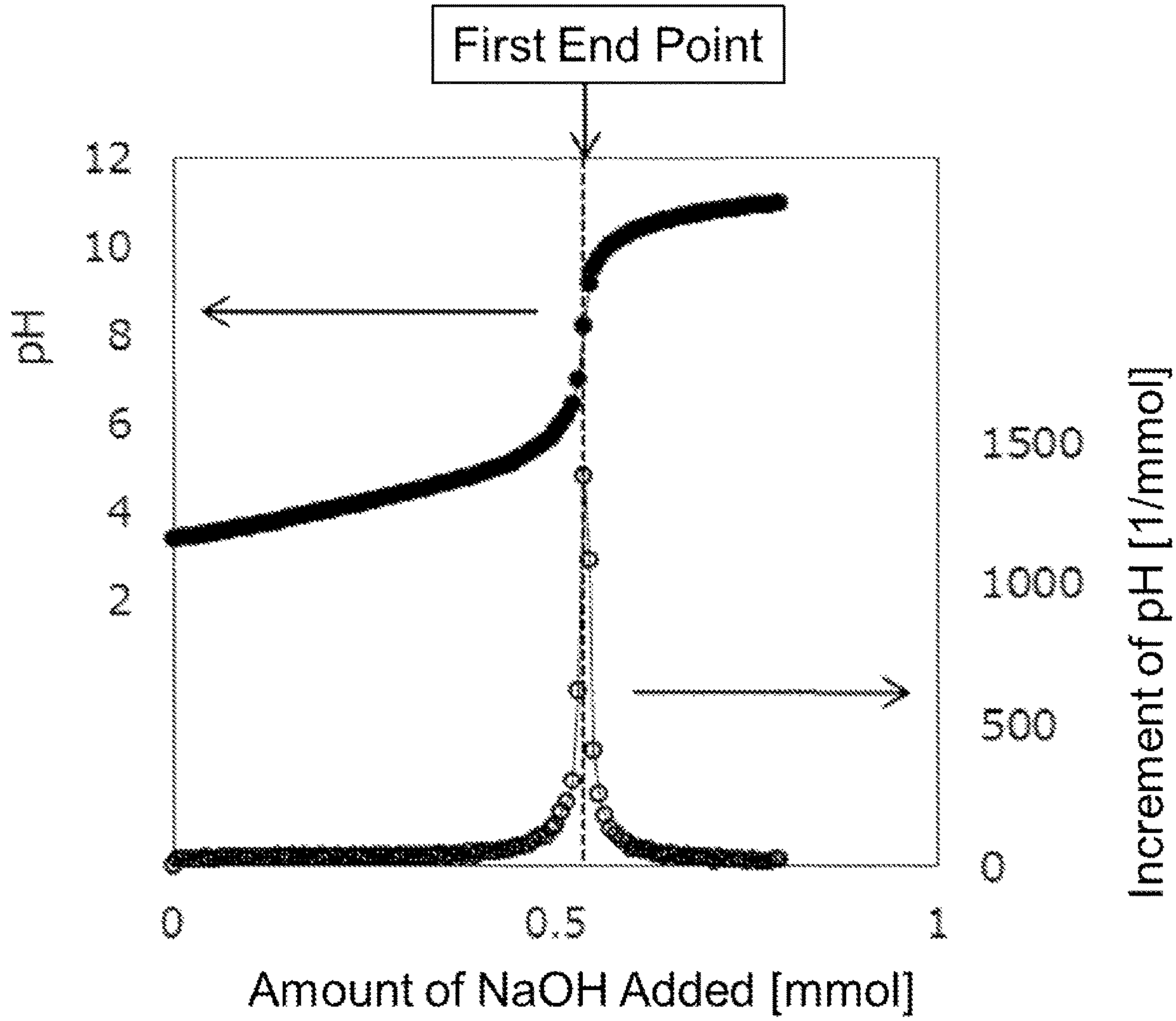

FIBROUS CELLULOSE, FIBROUS CELLULOSE DISPERSION, AND FIBROUS CELLULOSE PRODUCTION METHOD

CROSS REFERENCE TO RELATED APPLICATIONS

This application is a National Stage of International Application No. PCT/JP2021/016315 filed on Apr. 22, 2021, claiming priority based on Japanese Patent Application No. 2020-075908 filed on Apr. 22, 2020.

TECHNICAL FIELD

The present invention relates to fibrous cellulose, a fibrous cellulose dispersion fluid, and a production method for fibrous cellulose.

BACKGROUND ART

Cellulose fibers have been conventionally widely used for clothing or absorbent articles, paper products, etc. As for the cellulose fibers, in addition to fibrous cellulose whose fiber diameter is 10 μm or more and 50 μm or less, microfibrous cellulose whose fiber diameter is 1 μm or less is also known. The microfibrous cellulose is drawing attention as a new material, and its use extends over many fields.

In some cases, microfibrous cellulose is used as, for example, an additive of paint. In this case, the microfibrous cellulose can function as a viscosity modifier in the paint. For example, PTL 1 discloses a luster pigment dispersion containing water, a viscosity modifier (A), and a scaly luster pigment (B). In addition, PTL 2 discloses a luster pigment dispersion containing water, a scaly aluminum pigment, and a cellulose-based viscosity modifier. In PTL 1 and PTL 2, it is examined to use cellulose nanofibers as a viscosity modifier.

CITATION LIST

Patent Literature

PTL 1: WO 2018/012014
PTL 2: WO 2017/175468

SUMMARY OF INVENTION

Technical Problem

Cellulose nanofibers have been conventionally used for the purpose of enhancing the dispersibility of a pigment, etc., in paint. However, no attention has been paid to a deterioration of coating suitability of the paint, which is caused by a viscosity change (thixotropy) due to an application of shear before a coating, and there has been a demand for improving the coating suitability.

Thus, in order to solve these problems of prior art, the present inventors have conducted studies for the purpose of providing microfibrous cellulose capable of exhibiting an excellent dispersibility stability and an excellent coating suitability, when added to paint.

Solution to Problem

The present inventors have conducted intensive studies in order to solve the above-described problems, and as a result, they have obtained microfibrous cellulose in which when a dispersion fluid is prepared by dispersing predetermined microfibrous cellulose in water and is stirred under predetermined conditions, a viscosity change rate (%) before/after the stirring can fall within a predetermined range, and found that by adding the microfibrous cellulose to paint, the coating suitability of the paint can be improved, while maintaining the excellent dispersibility stability. Specifically, the present invention has the following configuration.

[1] Fibrous cellulose having a fiber width of 1,000 nm or less and containing an ionic substituent, wherein an amount of the ionic substituent in the fibrous cellulose is 0.10 mmol/g or more and 1.50 mmol/g or less, a polymerization degree of the fibrous cellulose is 150 or more and 515 or less, and when the fibrous cellulose is dispersed in a dispersion solvent containing water and isopropanol to obtain a dispersion fluid having a 7:3 mass ratio of water and isopropanol and a viscosity of 2,500 mPa·s at 23° C., and the dispersion fluid is stirred under following stirring conditions, a viscosity change rate falls within ±50% as calculated by following formula:

$$\text{viscosity change rate (\%)}=(\text{viscosity after stirring}-\text{viscosity before stirring})/\text{viscosity before stirring}\times 100$$

(Stirring Conditions)

the dispersion fluid having the viscosity of 2,500 mPa·s at 23° C. is poured into a cylindrical container having a diameter of 10 cm to a height of 5 cm, and is stirred at 23° C. for 24 hours by using an elliptical stirrer having a length of 5 cm, a center width of 2 cm, and an end width of 1 cm, while maintaining a 2 cm-recessed state at a center of a fluid surface.

[2] The fibrous cellulose according to [1], wherein the ionic substituent is a phosphorus oxoacid group or a substituent derived from the phosphorous oxoacid group.

[3] The fibrous cellulose according to [1] or [2], wherein when the dispersion fluid with 0.4% by mass of the fibrous cellulose is formed through dispersion in water, the viscosity of the dispersion fluid at 23° C. is 20 mPa·s or more and 4,700 mPa·s or less.

[4] The fibrous cellulose according to any one of [1] to [3], wherein when the dispersion fluid with 0.2% by mass of the fibrous cellulose is formed through dispersion in water, a haze of the dispersion fluid is 20% or less.

[5] The fibrous cellulose according to any one of [1] to [4], which is used for paint.

[6] A fibrous cellulose dispersion fluid obtained by dispersing the fibrous cellulose according to any one of [1] to [5] in a solvent containing water.

[7] A method of producing fibrous cellulose, including: performing a defibration treatment on cellulose fiber having 0.10 mmol/g or more and 1.50 mmol/g or less of an ionic substituent to obtain fibrous cellulose having a fiber width of 1,000 nm or less; and performing a thixotropy reduction treatment on the fibrous cellulose, wherein the performing the thixotropy reduction treatment reduces a polymerization degree of the fibrous cellulose to 150 or more and 515 or less.

Advantageous Effects of Invention

According to the present invention, it is possible to obtain microfibrous cellulose capable of exhibiting an excellent dispersion stability and an excellent coating suitability for particles such as a pigment, when added to paint.

BRIEF DESCRIPTION OF DRAWINGS

FIG. 1 is a graph illustrating a relationship between pH and an amount of NaOH added dropwise to a fibrous cellulose-containing slurry having a phosphorus oxoacid group; and FIG. 2 is a graph illustrating a relationship between pH and an amount of NaOH added dropwise to a fibrous cellulose-containing slurry having a carboxy group.

DESCRIPTION OF EMBODIMENTS

Hereinafter, the present invention will be described in detail. Descriptions of constituent elements described herein below may be made based on typical embodiments or specific examples, but the present invention is not limited to such embodiments.

[Microfibrous Cellulose]

An embodiment of the present invention relates to fibrous cellulose having a fiber width of 1,000 nm or less and containing an ionic substituent. The amount of ionic substituent in the fibrous cellulose of the present embodiment is 0.10 mmol/g or more and 1.50 mmol/g or less, and a polymerization degree of the fibrous cellulose is 150 or more and 515 or less. In this specification, the fibrous cellulose having the fiber width of 1,000 nm or less will also be referred to as microfibrous cellulose. Here, when the fibrous cellulose of the present embodiment is dispersed in a dispersion solvent containing water and isopropanol to obtain a dispersion fluid having a 7:3 mass ratio of water and isopropanol and a viscosity of 2,500 mPa·s at 23° C., and the corresponding dispersion fluid is stirred under the following stirring conditions, a viscosity change rate falls within ±50% as calculated by the following formula:

Viscosity change rate (%)=(viscosity after stirring−viscosity before stirring)/viscosity before stirring×100

(Stirring Conditions)

The dispersion fluid having the viscosity of 2,500 mPa·s at 23° C. is poured into a cylindrical container having a diameter of 10 cm to a height of 5 cm, and is stirred at 23° C. for 24 hours by using an elliptical stirrer having a length of 5 cm, a center width of 2 cm, and an end width of 1 cm, while maintaining a 2 cm-recessed state at the center of a fluid surface.

In the present embodiment, when microfibrous cellulose is dispersed in a dispersion solvent containing water and isopropanol to obtain a dispersion fluid having a 7:3 mass ratio of water and isopropanol and a viscosity of 2,500 mPa·s at 23° C., and the dispersion fluid is stirred under the stirring conditions described above, the viscosity change rate falls within ±50%, so that it is possible to obtain microfibrous cellulose capable of exhibiting the excellent coating suitability when added to paint.

In general, microfibrous cellulose having a fiber width of 1,000 nm or less can improve the viscosity of paint when added to the paint or the like, thereby improving a dispersibility of particles or the like in the paint. Meanwhile, when a relatively strong shear is applied to paint having a high thixotropy and containing the microfibrous cellulose, the viscosity decreases excessively, causing problems such as sagging of liquid or sedimentation of additives such as a pigment.

The dispersion fluid in which the microfibrous cellulose of the present embodiment is dispersed has the thixotropy controlled to an appropriate range, and thus, can exhibit the excellent coating suitability. For example, even when the paint containing the microfibrous cellulose of the present embodiment is stored or transported, the liquid sagging during a coating can be suppressed, and the sedimentation of additives such as a pigment can be suppressed, since the viscosity change of the paint is suppressed to an appropriate range. Further, even when the paint containing the microfibrous cellulose of the present embodiment is stirred for a long time so that a relatively strong shear is applied to the paint, the sagging of liquid or the sedimentation of additives such as a pigment which is caused by the decrease in viscosity of the paint may be effectively suppressed.

Further, the microfibrous cellulose of the present embodiment has an ability to appropriately adjust the viscosity, and thus, by adding the microfibrous cellulose to paint, the dispersion stability of particles such as a pigment in the paint (hereinafter, also simply referred to as "dispersion stability") can be improved.

That is, the microfibrous cellulose of the present embodiment can improve the dispersion stability of particles in paint, and further, can impart the excellent coating suitability and dispersibility stability of paint, by adjusting the thixotropy to an appropriate range.

The microfibrous cellulose of the present embodiment is preferably used for paint, and can improve the coating suitability of the paint as described above. Further, when the microfibrous cellulose of the present embodiment is used as an additive of paint, a smoothness or design of a coating film after a coating can also be improved. Specifically, in the present embodiment, a coating film with a smooth surface can be obtained. The smoothness of a coating film may be evaluated by a surface roughness (Ra) of the coating film, and when the surface roughness (Ra) of the coating film is 0.30 μm or less, it is evaluated that the surface is smooth. The surface roughness (Ra) of the coating film is preferably 0.10 μm or more, and more preferably 0.12 μm or more. The surface roughness (Ra) of the coating film is more preferably 0.28 μm or less, and still more preferably 0.20 μm or less. The surface roughness (Ra) of the coating film is a value obtained when an arithmetic average roughness (Ra) of a cured coating film is measured over a measurement range of 470.92 μm×353.16 μm by using an optical interference non-contact surface profile measuring device (non-contact surface layer cross-section profile measurement system VertScan 2.0, Model: R5500GML, manufactured by Ryoka Systems Inc.) with a ×10 object lens.

When the microfibrous cellulose of the present embodiment is used as an additive of paint, a generation of aggregates in a coating film can be suppressed. Thus, the design of an obtained coating film can be improved. Further, when the generation of aggregates in the coating film is suppressed, the smoothness or strength of the coating film can also be improved.

The viscosity change rate of the dispersion fluid calculated by the formula above may fall within ±50%. In this specification and the present embodiment, the range "within ±50%" indicates "−50% or more and +50% or less".

In general, in many cases, the viscosity change rate of the dispersion fluid decreases due to an application of shear to the dispersion fluid, and thus, the viscosity change rate calculated by the formula above becomes a negative value. That is, the viscosity change rate of the dispersion fluid is preferably −50% or more and 0% or less.

From the viewpoint of achieving both the low viscosity change rate and the viscosity adjusting ability by the addition of the microfibrous cellulose, thereby providing microfibrous cellulose exhibiting a transparency, and excellent defoaming performance and particle dispersibility when contained in paint, the viscosity change rate of the dispersion fluid calculated by the formula above is preferably −40% or more, more preferably −35% or more, and still more preferably −30% or more, and is preferably −5% or less, more preferably −10% or less, still more preferably −15% or less, and yet still more preferably −18% or less.

The viscosity change rate of the dispersion fluid calculated by the formula above is achieved by individually controlling, for example, a type or conditions of a treatment performed on the microfibrous cellulose, a polymerization degree of the microfibrous cellulose, an amount of ionic substituent, etc., to appropriate ranges.

In this specification, the viscosity before/after a stirring, which is used for calculating the viscosity change rate of the dispersion fluid, is a viscosity value after 1 minute from the start of measurement using a B-type viscometer at 23° C. at a rotation speed of 6 rpm. As the B-type viscometer, for example, an analog viscometer T-LVT manufactured by BLOOKFIELD may be used. Since the viscosity before a stirring is a viscosity of the dispersion fluid whose viscosity is adjusted to become about 2,500 mPa s, it is preferable that an actually measured value of the viscosity of the dispersion fluid becomes 2,500 mPa·s. However, an error of about ±15% may occur. That is, in the calculation formula of the viscosity change rate, the viscosity before a stirring is an actually measured viscosity of the dispersion fluid whose viscosity is adjusted to become about 2,500 mPa s, and is an actually measured viscosity value after 1 minute from the start of measurement using the B-type viscometer at 23° C. at a rotation speed of 6 rpm. Meanwhile, when the viscosity before a stirring is measured, a microfibrous cellulose dispersion fluid is poured into a cylindrical container having a diameter of 10 cm to a height of 5 cm, and is stirred by a disperser at 1,500 rpm for 5 minutes, and then, a measurement is performed after 1 minute from the end of stirring. In addition, when the viscosity of the dispersion fluid before a stirring is adjusted to about 2,500 mPa s, the addition amount of microfibrous cellulose to be used is properly adjusted. For example, by adjusting the content of microfibrous cellulose to 0.2 to 3.0% by mass relative to the total mass of the dispersion fluid, the viscosity of the dispersion fluid before a stirring may be adjusted to about 2,500 mPa·s.

In the calculation formula of the viscosity change rate, when the viscosity after a stirring is measured, first, the dispersion fluid provided for measuring the viscosity before a stirring is further stirred by a stirrer. Here, the dispersion fluid before a stirring (the microfibrous cellulose dispersion fluid) is poured into a cylindrical container having a diameter of 10 cm to a height of 5 cm, and is stirred for 24 hours by using an elliptical stirrer having a length of 5 cm, a center width of 2 cm, and an end width of 1 cm while maintaining a 2 cm-recessed state at the center of a fluid surface. The temperature of the fluid during the stirring is maintained at 23° C. Then, after 1 minute from the end of stirring, the viscosity is measured by using the B-type viscometer, and the viscosity value after 1 minute from the start of measurement at 23° C. at a rotation speed of 6 rpm is obtained as the viscosity after a stirring.

When the dispersion fluid for measuring the viscosity before/after a stirring is prepared, fibrous cellulose is dispersed in a dispersion solvent containing water and isopropanol. Here, the fibrous cellulose may be contained in an aqueous dispersion fluid, and in this case, it is preferable to add water to the fibrous cellulose aqueous dispersion fluid as necessary, and then, to add isopropanol thereto. When a sufficient amount of water is present in the fibrous cellulose aqueous dispersion fluid, only isopropanol may be added. In this way, the dispersion fluid is prepared such that the ratio between the total mass of the water contained in the fibrous cellulose aqueous dispersion fluid and the water added as necessary, and the mass of the added isopropanol becomes 7:3.

When the dispersion fluid with 0.4% by mass of the fibrous cellulose of the present embodiment is formed through dispersion in water, the viscosity of the dispersion fluid at 23° C. is preferably 20 mPa·s or more, more preferably 200 mPa·s or more, still more preferably 300 mPa·s or more, yet still more preferably 350 mPa·s or more, even yet still more preferably 400 mPa·s or more, even still more further preferably 600 mPa·s or more, even yet still more further preferably 1,000 mPa·s or more, particularly preferably 1,500 mPa·s or more, and most preferably 1,900 mPa·s or more, from the viewpoint of improving the dispersibility stability of particles by functioning as a viscosity modifier when added to paint. From the same viewpoint, the viscosity of the dispersion fluid at 23° C. is preferably 4,700 mPa·s or less, more preferably 4,000 mPa·s or less, still more preferably 3,500 mPa·s or less, yet still more preferably 3,000 mPa·s or less, and even yet still more preferably 2,500 mPa·s or less. The viscosity of the dispersion fluid with the microfibrous cellulose concentration of 0.4% by mass may be measured by using a B-type viscometer (analog viscometer T-LVT, manufactured by BLOOKFIELD). Under the measurement conditions of 23° C. and the rotation speed of 3 rpm, the viscosity after 3 minutes from the start of measurement is measured.

The fibrous cellulose of the present embodiment is microfibrous cellulose having a fiber width of 1,000 nm or less. The fiber width of the fibrous cellulose is more preferably 100 nm or less, and still more preferably 8 nm or less.

The fiber width of the fibrous cellulose may be measured by, for example, an observation with an electron microscope. The average fiber width of the fibrous cellulose is, for example, 1,000 nm or less. The average fiber width of the fibrous cellulose is preferably, for example, 2 nm or more and 1,000 nm or less, more preferably 2 nm or more and 100 nm or less, still more preferably 2 nm or more and 50 nm or less, yet still more preferably 2 nm or more and 10 nm or less, and particularly preferably 2 nm or more and 8 nm less. When the average fiber width of the fibrous cellulose is 2 nm or more, the dissolution as a cellulose molecule in water is suppressed, so that effects of the fibrous cellulose such as improvement in strength or rigidity, and dimensional stability can more easily be exhibited. The fibrous cellulose is, for example, single fibrous cellulose.

The average fiber width of the fibrous cellulose is measured by using, for example, an electron microscope in the following manner. First, an aqueous suspension of fibrous cellulose in a concentration of 0.05% by mass or more and 0.1% by mass or less is prepared, and the suspension is cast on a hydrophilized carbon film-coated grid to obtain a sample for a TEM observation. When fibers having a wide width are included, an SEM image of the surface cast on glass may be observed. Then, an observation is performed through an electron microscope image at any of magnifications of ×1,000, ×5,000, ×10,000, and ×50,000 according to the width of fiber to be observed. Meanwhile, the sample, the observation conditions, and the magnification are adjusted to satisfy the following conditions.

(1) One straight line X is drawn at an arbitrary position within an observation image, and 20 or more fibers intersect the corresponding straight line X.

(2) A straight line Y perpendicularly intersecting the corresponding straight line is drawn within the same image, and 20 or more fibers intersect the corresponding straight line Y.

In regard to the observation images satisfying the conditions, widths of fibers intersecting the straight lines X and Y are visually read. In this manner, three or more sets of observation images on at least surface portions that do not overlap each other are obtained. Next, for each image, widths of fibers intersecting the straight lines X and Y are read. Accordingly, at least 120 (=20×2×3) fiber widths are read. Then, the average value of the read fiber widths is set as an average fiber width of fibrous cellulose.

The fiber length of the fibrous cellulose is not particularly limited, but is, for example, preferably 0.1 μm or more and 1,000 μm or less, more preferably 0.1 μm or more and 800 μm or less, and still more preferably 0.1 μm or more and 600 μm or less. It is also preferable that the fiber length of the fibrous cellulose is, for example, 0.15 μm or more or 0.2 μm or more. It is also preferable that the fiber length of the fibrous cellulose is, for example, 100 μm or less, 10 μm or less, or 1 μm or less. When the fiber length is set within the ranges, a destruction of a crystal region of the fibrous cellulose can be suppressed. Further, it is possible to make the slurry viscosity of the fibrous cellulose fall within an appropriate range. The fiber length of the fibrous cellulose may be obtained through, for example, an image analysis by TEM, SEM, or AFM.

It is preferable that the fibrous cellulose has an I-type crystal structure. Here, the fact that the fibrous cellulose has the I-type crystal structure may be identified in a diffraction profile obtained from a wide-angle X-ray diffraction photograph using CuKα (λ=1.5418Å) monochromatized with graphite. Specifically, the identification may be performed from typical peaks present at two positions around 2θ=14° or more and 17° or less and around 2θ=22° or more and 23° or less. The occupying ratio of the I-type crystal structure in the microfibrous cellulose is preferably, for example, 30% or more, more preferably 40% or more, and still more preferably 50% or more. Accordingly, a more excellent performance may be expected in terms of a heat resistance and an occurrence of a low coefficient of linear thermal expansion. A degree of crystallinity may be obtained from a pattern in measurement of an X-ray diffraction profile, through a general method (Seagal et al, Textile Research Journal, vol 29, p 786, 1959).

The axial ratio (fiber length/fiber width) of the fibrous cellulose is not particularly limited, but is preferably, for example, 20 or more and 10,000 or less, more preferably 50 or more and 1,000 or less, still more preferably 50 or more and 500 or less, and yet still more preferably 50 or more and 250 or less. When the axial ratio is set to the lower limit value or more, it is easy to form a sheet containing the microfibrous cellulose. Further, it is easy to obtain a sufficient viscosity thickening property when a solvent dispersion is produced. When the axial ratio is set to the upper limit value or less, a handling such as dilution becomes easy, for example, in a case where the fibrous cellulose is treated as an aqueous dispersion fluid, which is preferable.

The fibrous cellulose in the present embodiment has, for example, both a crystalline region and a non-crystalline region. In particular, the microfibrous cellulose that has both the crystalline region and the non-crystalline region, and thus, has the high axial ratio is implemented by a method of producing microfibrous cellulose to be described later.

The fibrous cellulose in the present embodiment has, for example, at least one of an ionic substituent and a non-ionic substituent. From the viewpoint of improving the dispersibility of fibers in a dispersion medium, and improving a defibration efficiency during a defibration treatment, it is more preferable that the fibrous cellulose has an ionic substituent. As the ionic substituent, for example, either or both of an anionic group and a cationic group may be contained. In addition, as the non-ionic substituent, for example, an alkyl group and an acyl group may be contained. In the present embodiment, it is particularly preferable to have the anionic group as the ionic substituent.

Examples of the anionic group as the ionic substituent include an ester group or a substituent derived from the ester group (also simply referred to as an ester group), and a carboxy group or a substituent derived from the carboxy group (also simply referred to as a carboxy group). Examples of the ester group include a phosphorus oxoacid group or a substituent derived from the phosphorus oxoacid group (also simply referred to as a phosphorous oxoacid group), and a sulfur oxoacid group or a substituent derived from the sulfur oxoacid group (also simply referred to as a sulfur oxoacid group).

The anionic group as the ionic substituent is preferably, for example, at least one type selected from the phosphorus oxoacid group or the substituent derived from the phosphorus oxoacid group, the carboxy group or the substituent derived from the carboxy group, and the sulfur oxoacid group or the substituent derived from the sulfur oxoacid group, more preferably at least one selected from the phosphorus oxoacid group and the carboxy group, and particularly preferably the phosphorus oxoacid group. The microfibrous cellulose having the phosphorus oxoacid group can exhibit the more excellent coating suitability, when added to paint. Further, the anionic group as the ionic substituent is preferably the ester group, from the viewpoint of the transparency of a dispersion fluid, paint, and a coating film.

The phosphorus oxoacid group or the substituent derived from the phosphorus oxoacid group is, for example, a substituent represented by the following formula (1). The phosphorus oxoacid group is, for example, a divalent functional group corresponding to phosphoric acid from which a hydroxy group is removed. Specifically, the phosphorus oxoacid group is a group represented by $-PO_3H_2$. The substituent derived from the phosphorus oxoacid group includes substituents such as a salt of the phosphorus oxoacid group and a phosphorus oxoacid ester group. The substituent derived from the phosphorus oxoacid group may be contained in the fibrous cellulose as a group in which a phosphoric acid group is condensed (e.g., a pyrophosphoric acid group). Further, the phosphorus oxoacid group may be, for example, a phosphorous acid group (phosphonic acid group), and the substituent derived from the phosphorus oxoacid group may be a salt of the phosphorous acid group, a phosphorous acid ester group or the like.

(1)

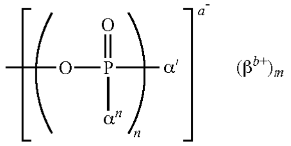

In the formula (1), "a", "b", and "n" are natural numbers (in which a=b×m). a of $\alpha^1$, $\alpha^2$, . . . , $\alpha^n$, and a' are $O^-$, and the rest are either R or OR. All of $\alpha^1$ to $\alpha^n$ and α' may be $O^-$.

R is a hydrogen atom, a saturated-linear hydrocarbon group, a saturated-branched hydrocarbon group, a saturated-cyclic hydrocarbon group, an unsaturated-linear hydrocarbon group, an unsaturated-branched hydrocarbon group, an unsaturated-cyclic hydrocarbon group, an aromatic group, or groups derived therefrom. Further, "n" is preferably 1.

Examples of the saturated-linear hydrocarbon group include a methyl group, an ethyl group, an n-propyl group, and an n-butyl group, but are not particularly limited. Examples of the saturated-branched hydrocarbon group include an i-propyl group and a t-butyl group, but are not particularly limited. Examples of the saturated-cyclic hydrocarbon group include a cyclopentyl group and a cyclohexyl group, but are not particularly limited. Examples of the unsaturated-linear hydrocarbon group include a vinyl group and an allyl group, but are not particularly limited. Examples of the unsaturated-branched hydrocarbon group include an i-propenyl group and a 3-butenyl group, but are not particularly limited. Examples of the unsaturated-cyclic hydrocarbon group include a cyclopentenyl group and a cyclohexenyl group, but are not particularly limited. Examples of the aromatic group include a phenyl group and a naphthyl group, but are not particularly limited.

In addition, examples of the derived group in R include functional groups in which at least one type of functional groups such as a carboxy group, a hydroxy group, and an amino group is added or substituted in the main chain or the side chain of the various hydrocarbon groups, but are not particularly limited. In addition, the number of carbon atoms constituting the main chain of R is not particularly limited, but is preferably 20 or less, and more preferably 10 or less. When the number of carbon atoms constituting the main chain of R is set within the range, the molecular weight of the phosphorous oxoacid group may be set in an appropriate range, so that the penetration into a fiber raw material may be facilitated, and the yield of the ultrafine cellulose fiber may be increased.

$ß^{b+}$ is a monovalent or polyvalent cation composed of an organic substance or an inorganic substance. Examples of the monovalent or polyvalent cation composed of the organic substance include aliphatic ammonium and aromatic ammonium, and examples of the monovalent or higher cation composed of the inorganic substance include ions of alkali metals such as sodium, potassium, or lithium, cations of divalent metals such as calcium or magnesium, and hydrogen ions, but are not particularly limited. Among these elements, one type or a combination of two or more types may be applied. The monovalent or polyvalent cation composed of the organic substance or the inorganic substance is preferably an ion of sodium or potassium which is hardly yellowed when the fiber raw material containing $ß^{b+}$ is heated, and is easily industrially used, but is not particularly limited. $ß^{b+}$ may be an organic onium ion, and in this case, is particularly preferably an organic ammonium ion.

The amount of ionic substituent introduced into the fibrous cellulose may be 0.10 mmol/g or more per 1 g (mass) of the fibrous cellulose, preferably 0.20 mmol/g or more, more preferably 0.30 mmol/g or more, still more preferably 0.40 mmol/g or more, yet still more preferably 0.50 mmol/g or more, even yet still more preferably 0.60 mmol/g or more, and particularly preferably 0.70 mmol/g or more. Further, the amount of ionic substituent introduced into the fibrous cellulose may be 1.50 mmol/g or less per 1 g (mass) of the fibrous cellulose, preferably 1.35 mmol/g or less, more preferably 1.20 mmol/g or less, and still more preferably 1.10 mmol/g or less. Further, the amount of ionic substituent introduced into the fibrous cellulose is also preferably 1.00 mmol/g or less per 1 g (mass) of the fibrous cellulose, and also more preferably 0.95 mmol/g or less. Here, the denominator in the unit mmol/g indicates the mass of the fibrous cellulose when the counterion of the ionic substituent is a hydrogen ion ($H^+$). When the introduction amount of ionic substituent is set within the ranges described above, it is possible to improve the dispersion stability of the fibrous cellulose in paint. Further, when the introduction amount of ionic substituent is set within the ranges described above, the thixotropy of paint to which the microfibrous cellulose is added may be adjusted to an appropriate range, so that the coating suitability can be more effectively improved.

The amount of ionic substituent introduced into the fibrous cellulose may be measured by, for example, a neutralization titration method. In the measurement according to the neutralization titration method, the introduction amount is measured by causing a change of pH while adding alkali such as a sodium hydroxide aqueous solution to an obtained fibrous cellulose-containing slurry.

FIG. 1 is a graph illustrating a relationship between pH and an amount of NaOH added dropwise to a fibrous cellulose-containing slurry having a phosphorus oxoacid group. For example, the amount of phosphorus oxoacid group introduced into the fibrous cellulose is measured as follows. First, the fibrous cellulose-containing slurry is treated with a strong acid ion exchange resin. As necessary, before the treatment with the strong acid ion exchange resin, the same defibration treatment as a defibration treatment step to be described later may be performed on the measurement target. Next, the change in pH is observed while a sodium hydroxide aqueous solution is added, so that a titration curve illustrated in the upper part of FIG. 1 is obtained. On the titration curve illustrated in the upper part of FIG. 1, a measured pH is plotted relative to the addition amount of alkali, and on a titration curve illustrated in the lower part of FIG. 1, a pH increment (differential value) (1/mmol) is plotted relative to the addition amount of alkali. In this neutralization titration, on the curve plotting the measured pH relative to the addition amount of alkali, two points at which the increment (a differential value of pH relative to a dropping amount of alkali) is maximized are observed. Of the points, a firstly obtained maximum point of the increment when alkali is added is called a first end point, and a secondly obtained maximum point of the increment is called a second end point. The amount of required alkali from the start of titration to the first end point becomes equal to a first dissociated acid amount of the fibrous cellulose contained in the slurry used for the titration, and the amount of required alkali from the first end point to the second end point becomes equal to a second dissociated acid amount of the fibrous cellulose contained in the slurry used for the titration, so that the amount of required alkali from the start of titration to the second end point becomes equal to the total dissociated acid amount of the fibrous cellulose contained in the slurry used for the titration. Then, a value obtained by dividing the amount of required alkali from the start of titration to the first end point by the solid content (g) in the slurry as a titration target becomes an introduction amount of the phosphorus oxoacid groups (mmol/g). The simple description of the introduction amount of phosphorus oxoacid group (or the amount of phosphorus oxoacid group) indicates the first dissociated acid amount. In FIG. 1, a region from the start of titration to the first end point is called a first region, and a region from the first end point to the second end point is called a second region. For example, when the phosphorus oxoacid group is a phosphoric acid group, and the phosphoric acid group causes a condensation, apparently, the amount of weak acid group (also referred to as a second dissociated acid amount in this specification) in the phosphorus oxoacid group decreases, and the amount of alkali required for the second region is smaller than the amount of alkali required for the first region. Meanwhile, the amount of strong acid group (also referred to as a first dissociated acid amount in this specification) in the phosphorus oxoacid group is the same as the amount of phosphorus atoms, regardless of the presence/absence of condensation. In addition, when the phosphorus oxoacid group is a phosphorous acid group, since there is no weak acid group in the phosphorus oxoacid group, the amount of alkali required for the second region may decrease, or the amount of alkali required for the second region may become zero. In this case, on the titration curve, there is one point at which a pH increment is maximized.

The above-described introduction amount of phosphorus oxoacid group (mmol/g) indicates the amount of phosphorus oxoacid group included in the acid-type fibrous cellulose (hereinafter, referred to as the amount of phosphorus oxoacid group (acid type)) because the denominator indicates the mass of acid-type fibrous cellulose. Meanwhile, when the counterion of the phosphorus oxoacid group is replaced with an arbitrary cation C so as to have a charge equivalent, the denominator may be converted into the mass of fibrous cellulose in which the corresponding cation C is a counterion, so that it is possible to obtain the amount of phosphorus oxoacid group included in the fibrous cellulose in which the cation C is a counterion (hereinafter, the amount of phosphorus oxoacid group (C type)).

That is, a calculation is performed by the following calculation formula.

$$\text{Amount of phosphorus oxoacid group}(C\text{ type})=\text{amount of phosphorus oxoacid group(acid type)}/\{1+(W-1)\times A/1{,}000\}$$

A [mmol/g]: the total amount of anions derived from phosphorus oxoacid group included in fibrous cellulose (the total dissociated acid amount of phosphorus oxoacid group)

W: formula weight of cation C per valence (e.g., Na is 23, and Al is 9)

FIG. 2 is a graph illustrating a relationship between pH and an amount of NaOH added dropwise to a fibrous cellulose-containing dispersion fluid having a carboxy group as an ionic substituent.

For example, the amount of carboxy group introduced into the fibrous cellulose is measured as follows. First, the fibrous cellulose-containing dispersion fluid is treated with a strong acid ion exchange resin.

As necessary, before the treatment with the strong acid ion exchange resin, the same defibration treatment as a defibration treatment step to be described later may be performed on the measurement target. Next, the change in pH is observed while a sodium hydroxide aqueous solution is added, so that a titration curve illustrated in the upper part of FIG. 2 is obtained. On the titration curve illustrated in the upper part of FIG. 2, a measured pH is plotted relative to the addition amount of alkali, and on a titration curve illustrated in the lower part of FIG. 2, a pH increment (differential value) (1/mmol) is plotted relative to the addition amount of alkali. In this neutralization titration, on the curve plotting the measured pH relative to the addition amount of alkali, one point at which the increment (a differential value of pH relative to a dropping amount of alkali) is maximized is observed. This maximum point is called a first end point. Here, a region from the start of titration to the first end point in FIG. 2 is called a first region. The amount of alkali required for the first region becomes equal to the amount of carboxy group in the dispersion fluid used for titration. Then, an introduction amount of the carboxy group (mmol/g) is calculated by dividing the amount of alkali (mmol) required for the first region on the titration curve by the solid content (g) in the fibrous cellulose-containing dispersion fluid as a titration target.

The above-described introduction amount of the carboxy group (mmol/g) indicates the amount of carboxy group included in the acid-type fibrous cellulose (hereinafter, referred to as the amount of carboxy group (acid type)) because the denominator is the mass of acid-type fibrous cellulose. Meanwhile, when the counterion of the carboxy group is replaced with an arbitrary cation C so as to have a charge equivalent, the denominator may be converted into the mass of fibrous cellulose in which the corresponding cation C is a counterion, so that it is possible to obtain the amount of carboxy group included in the fibrous cellulose in which the cation C is a counterion (hereinafter, the amount of carboxy group (C type)).

That is, a calculation is performed by the following calculation formula.

$$\text{Amount of carboxy group}(C\text{ type})=\text{amount of carboxy group(acid type)}/\{1+(W-1)\times(\text{amount of carboxy group(acid type)})/1{,}000\}$$

W: formula weight of cation C per valence (e.g., Na is 23, and Al is 9)

In the measurement of the amount of ionic substituent through the titration method, when the dropping amount of one drop of the sodium hydroxide aqueous solution is too large, or when the titration interval is too short, the amount of ionic substituent may become smaller than originally intended, that is, an accurate value may not be obtained. As for an appropriate dropping amount, and a titration interval, for example, it is preferable to titrate 10 to 50 μL of a 0.1 N sodium hydroxide aqueous solution at a time for 5 to 30 seconds. In addition, in order to eliminate the influence of carbon dioxide dissolved in the fibrous cellulose-containing slurry, for example, it is preferable to perform measurement while blowing inert gas such as nitrogen gas to the slurry from 15 minute before the start of titration to the end of titration.

Further, the amount of sulfur oxoacid group introduced into the microfibrous cellulose is measured by a wet ashing of a sample and an ICP emission spectrometry. Specifically, a fibrous cellulose-containing slurry is completely dried, then weighed, added with perchloric acid to be carbonized, and further added with concentrated nitric acid to oxidize carbons into carbon dioxide, so that a sample solution composed of only inorganic substance is obtained. Then, the sample solution is diluted with an appropriate ratio, and the concentration of sulfuric acid is measured by the ICP emission spectrometry. Next, the amount of sulfur atoms contained in the sample solution is divided by the absolute dry mass of the weighed fibrous cellulose, to obtain the amount of sulfur oxoacid group (unit: mmol/g).

The polymerization degree of the microfibrous cellulose may be 150 or more, preferably 200 or more, more preferably 300 or more, still more preferably 320 or more, yet still more preferably 340 or more, even yet still more preferably 360 or more, even still more further preferably 380 or more, even yet still more further preferably 400 or more, and particularly preferably 460 or more. Further, the polymerization degree of the microfibrous cellulose may be 515 or less, preferably 500 or less, and more preferably 490 or less.

When the polymerization degree of the microfibrous cellulose falls within the ranges described above, the thixotropy of paint to which the microfibrous cellulose is added can be reduced (thixotropy reduction) and adjusted to an appropriate range, so that the coating suitability can be more effectively improved. Further, when the polymerization degree of the microfibrous cellulose is set within the ranges described above, the smoothness, design, and strength of a coating film can be more effectively improved. Furthermore, when the polymerization degree is set within the ranges described above, the transparency of the microfibrous cellulose dispersion fluid is improved, which is preferable.

The polymerization degree of the microfibrous cellulose is a value calculated from a pulp viscosity measured according to Tappi T230. Specifically, after obtaining a viscosity measured by dispersing the microfibrous cellulose as a measurement target in a copper ethylenediamine aqueous solution (referred to as η1), and a blank viscosity measured by only a dispersion medium (referred to as η0), a specific viscosity (ηsp) and an intrinsic viscosity ([η]) are measured according to the following formulas.

$$\eta sp=(\eta 1/\eta 0)-1$$

$$[\eta]=\eta sp/(c(1+0.28\times\eta sp))$$

Here, "c" in the formula indicates a concentration of the microfibrous cellulose at the time of the viscosity measurement.

Further, the polymerization degree (DP) is calculated from the following formula.

$$DP=1.75\times[\eta]$$

This polymerization degree is an average polymerization degree measured according to a viscosity method, and thus, may be referred to as a "viscosity average polymerization degree".

In the present embodiment, preferably, the polymerization degree of the microfibrous cellulose is set to 300 or more and 515 or less, and the amount of ionic substituent in the microfibrous cellulose is set to 0.40 mmol/g or more and 1.20 mmol/g or less, and more preferably, the polymerization degree of the microfibrous cellulose is set to 460 or more and 490 or less, and the amount of ionic substituent in the microfibrous cellulose is set to 0.70 mmol/g or more and 0.95 mmol/g or less, so that while reducing the thixotropy of paint to which the microfibrous cellulose is added, the particle dispersibility can be improved, and as a result, the coating suitability of the paint can be more effectively improved. It can be understood that setting the polymerization degree of the microfibrous cellulose and the amount of ionic substituent to fall within appropriate ranges contributes to improving the particle dispersibility while exhibiting the thixotropy-reduced of the dispersion fluid in which the microfibrous cellulose is dispersed, which increases the coating suitability of paint.

(Method of Producing Microfibrous Cellulose)

<Fiber Raw Material>

The microfibrous cellulose is produced by a cellulose-containing fiber raw material. The cellulose-containing fiber raw material is not particularly limited, but a pulp is preferably used because the pulp is easily available and inexpensive. Examples of the pulp include wood pulp, non-wood pulp, and deinked pulp. The wood pulp is not particularly limited, but examples thereof include chemical pulps such as broad leaved tree kraft pulp (LBKP), needle leaved tree kraft pulp (NBKP), sulfite pulp (SP), dissolving pulp (DP), soda pulp (AP), unbleached kraft pulp (UKP), and oxygen bleached kraft pulp (OKP), semi-chemical pulps such as semi-chemical pulp (SCP) and chemigroundwood pulp (CGP), and mechanical pulps such as ground wood pulp (GP) and thermo-mechanical pulp (TMP, BCTMP). The non-wood pulp is not particularly limited, but examples thereof include cotton-based pulps such as cotton linter and cotton lint, and non-wood-based pulps such as hemp, straw, and bagasse. The deinked pulp is not particularly limited, but examples thereof include deinked pulp whose raw material is used paper. The pulp in the present embodiment may be used alone or in mixture of two or more thereof. Among the pulps, from the viewpoint of a high availability, for example, the wood pulp and the deinked pulp are preferable. Further, among the wood pulps, from the viewpoint of a high cellulose ratio and a high yield of microfibrous cellulose during a defibration treatment, or from the viewpoint of obtaining microfibrous cellulose of long fibers with a high axial ratio, in which the decomposition of cellulose in pulp is low, for example, the chemical pulp is more preferable, and the kraft pulp and the sulfite pulp are still more preferable. When the microfibrous cellulose of long fibers with a high axial ratio is used, the viscosity tends to increase.

Examples of the cellulose-containing fiber raw material include cellulose contained in ascidians or bacteria cellulose produced by acetic acid bacteria. In addition, instead of the cellulose-containing fiber raw material, fibers formed by linear nitrogen-containing polysaccharide polymers such as chitin and chitosan may be used.

<Phosphorus Oxoacid Group Introducing Step>

The step of producing the microfibrous cellulose includes an ionic substituent introducing step. The ionic substituent introduction step may be, for example, a phosphorus oxoacid group introducing step. The phosphorus oxoacid group introducing step is a step in which at least one type of compound selected from compounds capable of introducing a phosphorus oxoacid group by reacting with a hydroxy group included in the cellulose-containing fiber raw material (hereinafter, also referred to as a "compound A") is allowed to act on the cellulose-containing fiber raw material. Through this step, phosphorus oxoacid group-introduced fibers can be obtained.

In the phosphorus oxoacid group introducing step according to the present embodiment, the reaction between the cellulose-containing fiber raw material and the compound A may be performed under the presence of at least one type selected from urea and its derivatives (hereinafter, also referred to as a "compound B"). Meanwhile, the reaction between the cellulose-containing fiber raw material and the compound A may be performed in a state where the compound B is absent.

The method of allowing the compound A to act on the fiber raw material under the coexistence with the compound B may be, for example, a method of mixing the compounds A and B with the fiber raw material in a dry state, a wet state, or a slurry state. Among the states, in terms of a high uniformity of the reaction, it is preferable to use the fiber raw material in a dry state or a wet state, and it is particularly preferable to use the fiber raw material in a dry state. The form of the fiber raw material is not particularly limited, but is preferably, for example, cotton-like or thin sheet-like. There is also a method of adding each of the compounds A and B, in a powder state or in a state of a solution obtained through dissolution in a solvent or in a melted state made through heating to a melting point or higher, to the fiber raw material. Among the states, in terms of a high uniformity of the reaction, it is preferable to add each compound in a state of a solution obtained through dissolution in a solvent, in particular, in an aqueous solution state. In addition, the compounds A and B may be added to the fiber raw material at the same time, may be individually separately added, or may be added as a mixture. The method of adding the compounds A and B is not particularly limited, but when the compounds A and B are in a solution state, the fiber raw material may be immersed in the solution to absorb the liquid and then may be taken out, or the solution may be added dropwise to the fiber raw material. In addition, the compounds A and B may be added in required amounts to the fiber raw material, or after the compounds A and B are separately added in excessive amounts to the fiber raw material, the excessive compounds A and B may be removed through a pressing or a filtering.

The compound A used in the present embodiment may be a compound that has a phosphorus atom and is capable of forming an ester bond with cellulose, and examples thereof include phosphoric acid or a salt thereof, phosphorous acid or a salt thereof, dehydrated condensed phosphoric acid or a salt thereof, and phosphoric anhydride (diphosphorus pentoxide), but are not particularly limited. Examples of the phosphoric acid include those having various purities, for example, 100% phosphoric acid (orthophosphoric acid) or 85% phosphoric acid. Examples of the phosphorous acid include 99% phosphorous acid (phosphonic acid). The dehydrated condensed phosphoric acid is obtained by condensing two or more molecules of the phosphoric acid through a dehydration reaction, and examples thereof include pyrophosphoric acid and polyphosphoric acid. Examples of phosphate, phosphite, and dehydrated condensed phosphate include lithium salts, sodium salts, potassium salts, and ammonium salts of phosphoric acid, phosphorous acid or dehydrated condensed phosphoric acid, and these may have various degrees of neutralization. Among them, from the viewpoint of a high introduction efficiency of the phosphoric acid group, facilitating the improvement of defibration efficiency in a defibration step to be described later, a low cost, and an ease of industrial applicability, phosphoric acid, a sodium salt of phosphoric acid, a potassium salt of phosphoric acid, and an ammonium salt of phosphoric acid, or phosphorous acid, a sodium salt of phosphorous acid, a potassium salt of phosphorous acid, and an ammonium salt of phosphorous acid are preferable, and phosphoric acid, sodium dihydrogen phosphate, disodium hydrogen phosphate, ammonium dihydrogen phosphate, phosphorous acid, and phosphorous acid sodium are more preferable.

The amount of compound A added to the fiber raw material is not particularly limited, but, for example, in a case where the addition amount of the compound A is converted into a phosphorus atomic weight, the amount of phosphorus atoms added to the fiber raw material (absolute dry mass) is preferably 0.5% by mass or more and 100% by mass or less, more preferably 1% by mass or more and 50% by mass or less, and still more preferably 2% by mass or more and 30% by mass or less. When the amount of phosphorus atoms added to the fiber raw material is set within the ranges, the yield of the microfibrous cellulose can be further improved. Meanwhile, when the amount of phosphorus atoms added to the fiber raw material is set to the upper limit value or less, a yield improving effect and a cost can be balanced.

As described above, the compound B used in the present embodiment is at least one type selected from urea and its derivatives. Examples of the compound B include urea, biuret, 1-phenylurea, 1-benzylurea, 1-methylurea, and 1-ethylurea. From the viewpoint of improving the uniformity of a reaction, it is preferable to use the compound B as an aqueous solution. In addition, from the viewpoint of further improving the uniformity of a reaction, it is preferable to use an aqueous solution in which both the compounds A and B are dissolved.

The amount of compound B added to the fiber raw material (absolute dry mass) is not particularly limited, but is preferably, for example, 1% by mass or more and 500% by mass or less, more preferably 10% by mass or more and 400% by mass or less, still more preferably 100% by mass or more and 350% by mass or less.

In the reaction between the cellulose-containing fiber raw material and the compound A, in addition to the compound B, for example, amides or amines may be included in the reaction system. Examples of the amides include formamide, dimethylformamide, acetamide, and dimethylacetamide. Examples of the amines include methylamine, ethylamine, trimethylamine, triethylamine, monoethanolamine, diethanolamine, triethanolamine, pyridine, ethylenediamine, and hexamethylenediamine. Among them, especially, triethylamine is known to act as a good reaction catalyst.

In the phosphorus oxoacid group introducing step, it is preferable to add or mix the compound A, etc., to/with the fiber raw material, and then, subject the corresponding fiber raw material to a heating treatment. As for the temperature of the heating treatment, it is preferable to select a temperature at which the phosphorus oxoacid group can be efficiently introduced while suppressing a thermal decomposition or a hydrolysis reaction of fibers. The temperature of the heating treatment is preferably, for example, 50° C. or higher and 300° C. or lower, more preferably 100° C. or higher and 250° C. or lower, and still more preferably 130° C. or higher and 200° C. or lower. In addition, for the heating treatment, devices having various heat media may be used, and for example, a stirring drying device, a rotary drying device, a disk drying device, a roll-type heating device, a plate-type heating device, a fluidized bed drying device, a band type drying device, a filtration drying device, a vibration fluid drying device, an air flow drying device, a vacuum-drying device, an infrared heating device, a far-infrared heating device, a microwave heating device, or a radio-frequency drying device may be used.

For the heating treatment according to the present embodiment, it is possible to employ, for example, a method of performing a heating after adding the compound A to a thin sheet-like fiber raw material through a method such as impregnation, or a method of performing a heating while kneading or stirring the fiber raw material and the compound A by a kneader or the like. This makes it possible to suppress an unevenness of the concentration of the compound A in the fiber raw material, and to more uniformly introduce the phosphorus oxoacid groups onto the surfaces of cellulose fibers included in the fiber raw material. It can be understood that this is because as the drying is performed, when water molecules move to the surface of the fiber raw material, the dissolved compound A can be suppressed from being attracted to the water molecules by surface tension, and similarly moving to the surface of the fiber raw material (that is, unevenness of the concentration of the compound A is caused).

In addition, it is preferable that the heating device used for the heating treatment is, for example, a device capable of always discharging the water content retained by the slurry, and the water content produced according to a dehydration condensation (phosphate esterification) reaction between the compound A and a hydroxy group, etc., included in cellulose, etc., in the fiber raw material, to the outside of a device system. Examples of such a heating device include a blowing-type oven. By always discharging the water content within the device system, not only a hydrolysis reaction of a phosphoric acid ester bond, as a reverse reaction of phosphate esterification, can be suppressed, but also acid hydrolysis of a sugar chain within fibers can be suppressed. This makes it possible to obtain microfibrous cellulose with a high axial ratio.

The time for the heating treatment is preferably, for example, 1 second or longer and 300 minutes or shorter after the water content is substantially removed from the fiber raw material, more preferably 1 second or longer and 1,000 seconds or shorter, and still more preferably 10 seconds or longer and 800 seconds or shorter. In the present embodiment, by setting the heating temperature and the heating time within appropriate ranges, the introduction amount of the phosphorus oxoacid group may be set to fall within a preferable range.

The phosphorus oxoacid group introducing step only has to be performed at least once, but may be repeatedly performed twice or more. By performing the phosphorus oxoacid group introducing step twice or more, it is possible to introduce a large amount of phosphorus oxoacid group into the fiber raw material.

The amount of phosphorus oxoacid group introduced into the fibrous cellulose may be, for example, 0.10 mmol/g or more per 1 g (mass) of the microfibrous cellulose, preferably 0.20 mmol/g or more, more preferably 0.30 mmol/g or more, still more preferably 0.40 mmol/g or more, yet still more preferably 0.50 mmol/g or more, even yet still more preferably 0.60 mmol/g or more, and particularly preferably 0.70 mmol or more. Further, the amount of phosphorus oxoacid group introduced into the fibrous cellulose may be, for example, 1.50 mmol/g or less per 1 g (mass) of the microfibrous cellulose, preferably 1.35 mmol/g or less, more preferably 1.20 mmol/g or less, and still more preferably 1.10 mmol/g or less. Further, the amount of phosphorus oxoacid group introduced into the fibrous cellulose is also preferably 1.00 mmol/g or less per 1 g (mass) of the microfibrous cellulose, and also more preferably 0.95 mmol/g or less. When the introduction amount of the phosphorus oxoacid group is set within the ranges described above, it is possible to improve the dispersion stability of the microfibrous cellulose in paint. Further, when the introduction amount of the phosphorus oxoacid group is set within the ranges described above, the thixotropy of paint to which the microfibrous cellulose is added can be reduced and adjusted to an appropriate range, and the dispersion stability of particles can be improved, so that the coating suitability can be more effectively improved.

<Carboxy Group Introducing Step>

The step of producing the microfibrous cellulose may include, for example, a carboxy group introducing step as the ionic substituent introducing step. The carboxy group introducing step is performed by subjecting the cellulose-containing fiber raw material to an oxidation treatment such as ozone oxidation, oxidation using a Fenton method, or a TEMPO oxidation treatment, or a treatment with a compound having a carboxylic acid-derived group or its derivative, or an acid anhydride of a compound having a carboxylic acid-derived group or its derivative.

The compound having the carboxylic acid-derived group is not particularly limited, but examples thereof include dicarboxylic acid compounds such as maleic acid, succinic acid, phthalic acid, fumaric acid, glutaric acid, adipic acid, and itaconic acid, or tricarboxylic acid compounds such as citric acid, and aconitic acid. In addition, the derivative of the compound having the carboxylic acid-derived group is not particularly limited, but examples thereof include imidization products of an acid anhydride of a compound having a carboxy group, and derivatives of an acid anhydride of a compound having a carboxy group. The imidization product of the acid anhydride of the compound having the carboxy group is not particularly limited, but examples thereof include imidization products of dicarboxylic acid compounds, such as maleimide, succinimide, and phthalimide.

The acid anhydride of the compound having the carboxylic acid-derived group is not particularly limited, but examples thereof include acid anhydrides of dicarboxylic acid compounds, such as maleic anhydride, succinic anhydride, phthalic anhydride, glutaric anhydride, adipic anhydride, and itaconic anhydride. In addition, the derivative of the acid anhydride of the compound having the carboxylic acid-derived group is not particularly limited, but examples thereof include those in which at least a part of hydrogen atoms of the acid anhydride of the compound having the carboxy group, such as dimethylmaleic anhydride, diethylmaleic anhydride, or diphenylmaleic anhydride, is substituted with a substituent such as an alkyl group or a phenyl group.

In the carboxy group introducing step, when the TEMPO oxidation treatment is performed, for example, it is preferable to perform the treatment under a condition where pH is 6 or more and 8 or less. This treatment is also called a neutral TEMPO oxidation treatment. The neutral TEMPO oxidation treatment may be performed by adding, for example, a pulp as the fiber raw material, a nitroxy radical such as TEMPO (2,2,6,6-tetramethylpiperidine-1-oxyl) as a catalyst, and sodium hypochlorite as a sacrificial reagent, to sodium phosphate buffer (pH=6.8). Further, through the coexistence with sodium chlorite, aldehyde generated in the oxidation process can be efficiently oxidized to a carboxy group.

In addition, in the TEMPO oxidation treatment, the treatment may be performed under a condition where pH is 10 or more and 11 or less. This treatment is also called an alkali TEMPO oxidation treatment. For example, the alkali TEMPO oxidation treatment may be performed by adding a nitroxy radical such as TEMPO as a catalyst, sodium bromide as a co-catalyst, and sodium hypochlorite as an oxidant, to a pulp as the fiber raw material.

The amount of carboxy group introduced into the fibrous cellulose also varies according to a type of substituent, and for example, when the carboxyl group is introduced by the TEMPO oxidation, the introduction amount of the carboxy group may be 0.10 mmol/g or more per 1 g (mass) of the microfibrous cellulose, preferably 0.20 mmol/g or more, more preferably 0.30 mmol/g or more, still more preferably 0.40 mmol/g or more, yet still more preferably 0.50 mmol/g or more, and particularly preferably 0.60 mmol/g or more. Further, the amount of carboxy group introduced into the fibrous cellulose may be 1.50 mmol/g or less, preferably 1.35 mmol/g or less, more preferably 1.20 mmol/g or less, and still more preferably 0.10 mmol/g or less. Further, the amount of carboxyl group introduced into the fibrous cellulose is also preferably 1.00 mmol/g or less per 1 g (mass) of the fibrous cellulose, and also more preferably 0.95 mmol/g or less. When the introduction amount of the carboxy group is set within the ranges, it is possible to improve the dispersion stability of the microfibrous cellulose in paint. Further, when the introduction amount of the carboxy group is set within the ranges described above, the thixotropy of paint to which the microfibrous cellulose is added can be reduced and adjusted to an appropriate range, so that the coating suitability can be more effectively improved.

<Sulfur Oxoacid Group Introducing Step>

The step of producing the microfibrous cellulose may include, for example, a sulfur oxoacid group introducing step as the ionic substituent introducing step. In the sulfur oxoacid group introducing step, cellulose fibers having a sulfur oxoacid group (sulfur oxoacid group-introduced fibers) can be obtained, through a reaction between a hydroxy group of a cellulose-containing fiber raw material and sulfur oxoacid.

In the sulfur oxoacid group introducing step, instead of the compound A described in <Phosphorus Oxoacid Group Introducing Step> above, at least one type of compound selected from compounds capable of introducing the sulfur oxoacid group by reacting with the hydroxyl group included in the cellulose-containing fiber raw material (hereinafter, also referred to as a “compound C”) is used. The compound C may be a compound that has a sulfur atom and is capable of forming an ester bond with cellulose, and examples thereof include sulfuric acid or a salt thereof, and sulfurous acid or a salt thereof, but are not particularly limited. Examples of the sulfuric acid include those having various purities, for example, 96% sulfuric acid (concentrated sulfuric acid). Examples of the sulfurous acid include 5% sulfurous acid water. Examples of sulphate or sulfite include lithium salts, sodium salts, potassium salts, and ammonium salts of sulphate or sulfite, and these may have various degrees of neutralization. As sulfuric acid amide, for example, sulfamic acid may be used. In the sulfur oxoacid group introducing step, it is preferable to also use the compound B described in <Phosphorus Oxoacid Group Introducing Step> above.

In the sulfur oxoacid group introducing step, it is preferable to mix the cellulose raw material with an aqueous solution containing sulfur oxoacid, and urea and/or derivatives thereof, and then, subject the corresponding cellulose raw material to a heating treatment. As for the temperature of the heating treatment, it is preferable to select a temperature at which the sulfur oxoacid group can be efficiently introduced while suppressing a thermal decomposition or a hydrolysis reaction of fibers. The temperature of the heating treatment is preferably 100° C. or higher, more preferably 120° C. or higher, and still more preferably 150° C. or higher. Further, the temperature of the heating treatment is preferably 300° C. or lower, more preferably 250° C. or lower, and still more preferably 200° C. or lower.

In the heating treatment step, it is preferable to perform the heating until the moisture is substantially removed. Thus, the time for the heating treatment varies according to the amount of moisture contained in the cellulose raw material, or the amount of added aqueous solution containing sulfur oxoacid, and urea and/or derivatives thereof, but is preferably, for example, 10 seconds or longer and 10,000 seconds or shorter. For the heating treatment, devices having various heat media may be used, and for example, a stirring drying device, a rotary drying device, a disk drying device, a roll-type heating device, a plate-type heating device, a fluidized bed drying device, a band type drying device, a filtration drying device, a vibration fluid drying device, an air flow drying device, a vacuum-drying device, an infrared heating device, a far-infrared heating device, a microwave heating device, or a radio-frequency drying device may be used.

The amount of sulfur oxoacid group introduced into the cellulose raw material may be 0.10 mmol/g or more, preferably 0.20 mmol/g or more, more preferably 0.30 mmol/g or more, still more preferably 0.40 mmol/g or more, yet still more preferably 0.50 mmol/g or more, even yet still more preferably 0.60 mmol/g or more, and further preferably 0.70 mmol/g or more. Further, the amount of sulfur oxoacid group introduced into the cellulose raw material may be 1.50 mmol/g or less, preferably 1.35 mmol/g or less, more preferably 1.20 mmol/g or less, and still more preferably 1.10 mmol/g or less. Further, the amount of sulfur oxoacid group introduced into the fibrous cellulose is also preferably 1.00 mmol/g or less per 1 g (mass) of the fibrous cellulose, and also more preferably 0.95 mmol/g or less. When the introduction amount of the sulfur oxoacid group is set within the ranges described above, it is possible to improve the dispersion stability of the microfibrous cellulose in paint. Further, when the introduction amount of the sulfur oxoacid group is set within the ranges described above, the thixotropy of paint to which the microfibrous cellulose is added can be reduced and adjusted to an appropriate range, so that the coating suitability can be more effectively improved.

<Washing Step>

In the method of producing the microfibrous cellulose according to the present embodiment, as necessary, a washing step may be performed on the ionic substituent-introduced fibers.

The washing step is performed by washing the ionic substituent-introduced fibers with, for example, water or an organic solvent. In addition, the washing step may be performed after each step to be described later, and the number of times of a washing performed in each washing step is not particularly limited.

<Alkali Treatment Step>

When the microfibrous cellulose is produced, an alkali treatment may be performed on the fiber raw material between the ionic substituent introducing step and a defibration treatment step to be described later.

The method of the alkali treatment is not particularly limited, but may be, for example, a method of immersing the ionic substituent-introduced fibers in an alkali solution.

An alkali compound contained in the alkali solution is not particularly limited, and may be an inorganic alkali compound or an organic alkali compound. In the present embodiment, for example, sodium hydroxide or potassium hydroxide may be preferably used as the alkali compound, in terms of a high versatility. In addition, a solvent contained in the alkali solution may be either water or an organic solvent. Among them, the solvent contained in the alkali solution is preferably a polar solvent including, for example, water and a polar organic solvent such as alcohol, more preferably an aqueous solvent including at least water. As the alkali solution, in terms of a high versatility, for example, a sodium hydroxide aqueous solution or a potassium hydroxide aqueous solution is preferable.

The temperature of the alkali solution in the alkali treatment step is not particularly limited, but is preferably, for example, 5° C. or higher and 80° C. or lower, and more preferably 10° C. or higher and 60° C. or lower. The time for immersing the ionic substituent-introduced fibers in the alkali solution during the alkali treatment step is not particularly limited, but is preferably, for example, 5 minutes or longer and 30 minutes or shorter, and more preferably 10 minutes or longer and 20 minutes or shorter. The use amount of the alkali solution in the alkali treatment is not particularly limited, but is preferably, for example, 100% by mass or more and 100,000% by mass or less relative to the absolute dry mass of the ionic substituent-introduced fibers, and more preferably 1,000% by mass or more and 10,000% by mass or less.

In order to reduce the use amount of the alkali solution in the alkali treatment step, the ionic substituent-introduced fibers may be washed with water or an organic solvent after the ionic substituent introducing step and before the alkali treatment step. Before the defibration treatment step subsequent to the alkali treatment step, it is preferable that the ionic substituent-introduced fibers which have been subjected to the alkali treatment are washed with water or an organic solvent, from the viewpoint of improving a handleability.

<Acid Treatment Step>

When the microfibrous cellulose is produced, an acid treatment may be performed on the fiber raw material between the ionic substituent introducing step and the defibration treatment step to be described later. For example, the ionic substituent introducing step, the acid treatment, the alkali treatment, and the defibration treatment may be performed in this order.

The method for the acid treatment is not particularly limited, but may be, for example, a method of immersing the fiber raw material in an acid-containing acidic liquid. The concentration of the acidic liquid to be used is not particularly limited, but is preferably, for example, 10% by mass or less, and more preferably 5% by mass or less. In addition, pH of the acidic liquid to be used is not particularly limited, but is preferably, for example, 0 or more and 4 or less, and more preferably 1 or more and 3 or less. Examples of the acid contained in the acidic liquid include inorganic acid, sulfonic acid, and carboxylic acid. Examples of the inorganic acid include sulfuric acid, nitric acid, hydrochloric acid, hydrobromic acid, hydroiodic acid, hypochlorous acid, chlorous acid, chloric acid, perchloric acid, phosphoric acid, and boric acid. Examples of the sulfonic acid include methanesulfonic acid, ethanesulfonic acid, benzenesulfonic acid, p-toluenesulfonic acid, and trifluoromethanesulfonic acid. Examples of the carboxylic acid include formic acid, acetic acid, citric acid, gluconic acid, lactic acid, oxalic acid, and tartaric acid. Among them, it is particularly preferable to use hydrochloric acid or sulfuric acid.

The temperature of the acid solution in the acid treatment is not particularly limited, but is preferably, for example, 5° C. or higher and 100° C. or lower, and more preferably 20° C. or higher and 90° C. or lower. The time for the immersion in the acid solution during the acid treatment is not particularly limited, but is preferably, for example, 5 minutes or longer and 120 minutes or shorter, and more preferably 10 minutes or longer and 60 minutes or shorter. The use amount of the acid solution during the acid treatment is not particularly limited, but is preferably, for example, 100% by mass or more and 100,000% by mass or less relative to the absolute dry mass of the fiber raw material, and more preferably 1,000% by mass or more and 10,000% by mass or less.

<Defibration Treatment>

The microfibrous cellulose is obtained by defibering the ionic substituent-introduced fibers in the defibration treatment step. For the defibration treatment step, for example, a defibration treatment device may be used. The defibration treatment device is not particularly limited, but, for example, a high-speed defibrator, a grinder (a millstone-type crusher), a high-pressure homogenizer or an ultra-high-pressure homogenizer, a high-pressure collision-type crusher, a ball mill, a bead mill, a disc-type refiner, a conical refiner, a twin-screw kneader, a vibration mill, a homomixer under high-speed rotation, an ultrasonic disperser, a beater or the like may be used. Among the defibration treatment devices, it is more preferable to use the high-speed defibrator, the high-pressure homogenizer, or the ultra-high-pressure homogenizer which is less affected by a crushing medium and has a low risk of contamination.

In the defibration treatment step, for example, it is preferable that the ionic substituent-introduced fibers are diluted with a dispersion medium to obtain a slurry form. The dispersion medium may include one type or two or more types selected from water, and organic solvents such as a polar organic solvent. The polar organic solvent is not particularly limited, but for example, alcohols, polyhydric alcohols, ketones, ethers, esters, an aprotic polar solvent and the like are preferable. Examples of the alcohols include methanol, ethanol, isopropanol, n-butanol, and isobutylalcohol. Examples of the polyhydric alcohols include ethyleneglycol, propyleneglycol, and glycerin. Examples of the ketones include acetone, and methylethylketone (MEK). Examples of the ethers include diethylether, tetrahydrofuran, ethyleneglycolmonomethylether, ethyleneglycolmonoethylether, ethyleneglycolmono n-butylether, and propyleneglycolmonomethylether. Examples of the esters include ethyl acetate, and butyl acetate. Examples of the aprotic polar solvent include dimethylsulfoxide (DMSO), dimethylformamide (DMF), dimethylacetamide (DMAc), and N-methyl-2-pyrrolidinone (NMP).

The solid content concentration of the microfibrous cellulose at the time of the defibration treatment may be properly set. In addition, the slurry obtained by dispersing the ionic substituent-introduced fibers in the dispersion medium may contain, for example, any solid content other than the ionic substituent-introduced fibers, such as urea having a hydrogen bondability.

<Thixotropy Reduction Treatment>

It is preferable that the method of producing the microfibrous cellulose according to the present embodiment includes a step of performing a thixotropy reduction treatment, in addition to the above-described steps. Specifically, as described above, it is preferable to include a step of obtaining the fibrous cellulose with a fiber width of 1,000 nm or less by subjecting the properly treated cellulose fibers to the defibration treatment, and a step of performing the thixotropy reduction treatment on the fibrous cellulose. That is, it is preferable that the method of producing the microfibrous cellulose according to the present embodiment includes, for example, the step of performing the thixotropy reduction treatment after the defibration treatment is performed on the cellulose fibers. As described above, it is preferable to further include the step of introducing the ionic substituent into the cellulose fibers, before the defibration treatment step, and in the ionic-substituent introducing step, the ionic substituent is introduced such that the amount of ionic substituent becomes 0.10 mmol/g or more and 1.50 mmol/g or less. It is also preferable to further include the washing step or the alkali treatment step, in addition to the ionic-substituent introducing step.

Since the amount of ionic substituent in the microfibrous cellulose hardly changes even by the thixotropy reduction treatment, the amount of ionic substituent in the microfibrous cellulose before the thixotropy reduction treatment may be approximate to the amount of ionic substituent in the microfibrous cellulose after the thixotropy reduction treatment.

In this specification, the step of performing the thixotropy reduction treatment is a step of reducing the thixotropy of the dispersion fluid containing the microfibrous cellulose to an appropriate range. Specifically, the step of performing the thixotropy reduction treatment is preferably a step of adjusting the polymerization degree of the fibrous cellulose having a fiber width of 1,000 nm or less, to 150 or more and 515 or less. Thus, the thixotropy reduction treatment may be called a polymerization degree reduction treatment. The polymerization degree of the microfibrous cellulose obtained in the step of performing the thixotropy reduction treatment may be 150 or more, preferably 200 or more, more preferably 300 or more, still more preferably 320 or more, yet still more preferably 340 or more, even yet still more preferably 360 or more, even still more further preferably 380 or more, even yet still more further preferably 400 or more, and particularly preferably 460 or more. The polymerization degree of the microfibrous cellulose obtained in the step of performing the thixotropy reduction treatment may be 515 or less, preferably 500 or less, and more preferably 490 or less.

Examples of the step of performing the thixotropy reduction treatment include an ozone treatment step, an enzyme treatment step, a hypochlorous acid treatment step, and a sub-critical water treatment step. The step of performing the thixotropy reduction treatment is preferably at least one type selected from the ozone treatment step, the enzyme treatment step, the hypochlorous acid treatment step, and the sub-critical water treatment step, and is particularly preferably the ozone treatment step. The ozone treatment step, the enzyme treatment step, the hypochlorous acid treatment step, and the sub-critical water treatment step are common in terms of a polymerization degree reduction treatment. The thixotropy reduction treatment is implemented by the polymerization degree reduction treatment, and as a result, the microfibrous cellulose and the microfibrous cellulose dispersion fluid according to the present embodiment are obtained.

In the ozone treatment step, ozone is added to the microfibrous cellulose dispersion fluid (slurry). When ozone is added, for example, it is preferable to add an ozone/oxygen mixed gas. Here, the ozone addition rate per 1 g of the microfibrous cellulose contained in the microfibrous cellulose dispersion fluid (slurry) is preferably $1.0\times10^{-4}$ g or more, and more preferably $1.0\times10^{-3}$ g or more. The ozone addition rate per 1 g of the microfibrous cellulose is preferably $1.0\times10^{1}$ g or less, more preferably $1.0\times10^{0}$ g or less, still more preferably $1.0\times10^{-1}$ g or less, yet still more preferably $3.0\times10^{-2}$ g or less, even yet still more preferably $1.5\times10^{-2}$ g or less, further preferably $1.0\times10^{-2}$ g or less, and particularly preferably $6.0\times10^{-3}$ g or less. It is preferable that after the addition of ozone to the microfibrous cellulose dispersion fluid (slurry), the slurry is stirred under a condition of 10° C. or higher and 50° C. or lower for 10 seconds or longer and 10 minutes or shorter, and then, is allowed to stand still for 1 minute or longer and 100 minutes or shorter.

In the enzyme treatment step, an enzyme is added to the microfibrous cellulose dispersion fluid (slurry). Here, the enzyme to be used is preferably a cellulase-based enzyme. The cellulase-based enzyme is classified into carbohydrate hydrolase families based on the higher-order structure of a catalyst domain having a cellulose hydrolysis reaction function. The cellulase-based enzyme is roughly classified into endo-glucanase and cellobiohydrolase according to cellulose decomposition characteristics. The endo-glucanase is highly hydrolyzable for an amorphous portion of cellulose or soluble cellooligosaccharides, or cellulose derivatives such as carboxymethylcellulose, and randomly cleaves their molecular chains from the inside, thereby decreasing the polymerization degree. Meanwhile, the cellobiohydrolase decomposes a crystalline portion of cellulose, thereby giving cellobiose. In addition, the cellobiohydrolase hydrolyzes a cellulose molecule from the end thereof, and thus, is also called an exo-type or processive enzyme. The enzyme used in the enzyme treatment step is not particularly limited, but it is preferable to use endo-glucanase.

In the enzyme treatment step, the addition rate of the enzyme is preferably $1.0\times10^{-7}$ g or more relative to 1 g of the microfibrous cellulose, more preferably $1.0\times10^{-6}$ g or more, still more preferably $5.0\times10^{-6}$ g or more, and yet still more preferably $1.0\times10^{-5}$ g or more. Further, the addition rate of the enzyme is preferably $1.0\times10^{-2}$ g or less relative to 1 g of the microfibrous cellulose. It is preferable that after the addition of enzyme to the microfibrous cellulose dispersion fluid (slurry), the slurry is stirred under a condition of 30° C. or higher and 70° C. or lower for 1 minute or longer and 10 hours or shorter, and then, is put under a condition of 90° C. or higher so as to inactivate the enzyme.

In the hypochlorous acid treatment step, sodium hypochlorite is added to the microfibrous cellulose dispersion fluid (slurry). The addition rate of hypochlorous acid is preferably $1.0\times10^{-4}$ g or more relative to 1 g of the microfibrous cellulose, more preferably $1.0\times10^{-3}$ g or more, and still more preferably $1.0\times10^{-2}$ g or more. Further, the addition rate of hypochlorous acid is preferably $1.0\times10^{2}$ g or less relative to 1 g of the microfibrous cellulose, more preferably $1.0\times10^{1}$ g or less, and still more preferably $3\times10^{0}$ g or less. It is preferable that after the addition of hypochlorous acid to the microfibrous cellulose dispersion fluid (slurry), the slurry is stirred under a condition of 10° C. or higher and 50° C. or lower for 1 minute or longer and 10 hours or shorter.

In the sub-critical water treatment step, the microfibrous cellulose dispersion fluid (slurry) is subjected to a high temperature/high pressure treatment to be brought into a sub-critical state. The microfibrous cellulose is hydrolyzed in the sub-critical state. Specifically, after the microfibrous cellulose dispersion fluid (slurry) is put in a reaction vessel, the temperature is raised to 150° C. or higher and 500° C. or lower, and preferably 150° C. or higher and 350° C. or lower, and the pressure within the reaction vessel is pressurized to 10 MPa or more and 80 Mpa or less, and preferably 10 MPa or more and 20 MPa or less. Here, the heating/pressurizing time is preferably 0.1 seconds or longer and 100 seconds or shorter, and more preferably 0.3 seconds or longer and 50 seconds or shorter.

After the thixotropy reduction treatment described above, an additional defibration treatment step may be designed. The additional defibration treatment step may be the same as the defibration treatment step performed to obtain the fibrous cellulose having the fiber width of 1,000 nm or less as described above.

(Fibrous Cellulose Dispersion Fluid)

The present embodiment also relates to a fibrous cellulose dispersion fluid obtained by dispersing the above-described microfibrous cellulose in a solvent containing water (also referred to as a microfibrous cellulose-containing slurry or a slurry). The fibrous cellulose dispersion fluid may be, for example, a paint dispersion fluid which is used to be added to paint.

The content of the microfibrous cellulose in the fibrous cellulose dispersion fluid is preferably 0.1% by mass or more relative to the total mass of the fibrous cellulose dispersion fluid, more preferably 0.3% by mass or more, still more preferably 0.5% by mass or more, yet still more preferably 1.0% by mass or more, and even yet still more preferably 1.5% by mass or more. Further, the content of the microfibrous cellulose is preferably 8.0% by mass or less relative to the total mass of the fibrous cellulose dispersion fluid, more preferably 7.0% by mass or less, still more preferably 6.0% by mass or less, and yet still more preferably 5.0% by mass or less.

When the fibrous cellulose dispersion fluid is obtained by dispersing the fibrous cellulose in water such that the microfibrous cellulose concentration becomes 0.4% by mass, the viscosity of the dispersion fluid at 23° C. is preferably 20 mPa·s or more, more preferably 200 mPa·s or more, still more preferably 300 mPa·s or more, yet still more preferably 350 mPa·s or more, and particularly preferably 400 mPa·s or more. Further, the viscosity is more preferably 600 mPa·s or more, still more preferably 1,000 mPa·s or more, particularly preferably 1,500 mPa·s or more, and most preferably 1,900 mPa·s or more. Further, the viscosity of the dispersion fluid at 23° C. is preferably 4,700 mPa·s or less, more preferably 4,000 mPa·s or less, still more preferably 3,500 mPa·s or less, yet still more preferably 3,000 mPa·s or less, and particularly preferably 2,500 mPa·s or less.

The viscosity of the dispersion fluid having the microfibrous cellulose concentration of 0.4% by mass may be measured by using a B-type viscometer (analog viscometer T-LVT, manufactured by BLOOKFIELD). Under measurement conditions of 23° C. and a rotation speed of 3 rpm, the viscosity after 3 minutes from the start of measurement is measured.

When the fibrous cellulose dispersion fluid is obtained by dispersing the microfibrous cellulose in water such that the microfibrous cellulose concentration becomes 0.2% by mass, the haze of the dispersion fluid is preferably 20% or less, more preferably 15% or less, still more preferably 10% or less, and yet still more preferably 9.5% or less. When the haze of the dispersion fluid falls within these ranges, this indicates that the fibrous cellulose dispersion fluid has a high transparency, and the micronization of the microfibrous cellulose is satisfactory. When such a fibrous cellulose dispersion fluid is added to paint, the paint can exhibit the excellent coating suitability. Here, the haze of the fibrous cellulose dispersion fluid (microfibrous cellulose concentration of 0.2% by mass) is a value measured by using a hazemeter (HM-150, manufactured by Murakami Color Research Laboratory, Co., Ltd.) in accordance with JIS K 7136:2000 after the fibrous cellulose dispersion fluid is put in a glass cell for a liquid with an optical path length of 1 cm (MG-40, manufactured by Fujiwara Scientific, an inverse optical path). A zero point measurement is performed with ion exchange water put in the same glass cell.

The haze tends to be low as the introduction amount of ionic group increases, and is also affected by a type of an introduced ionic group. Further, the haze tends to be low when the concentration during the defibration treatment is low, and when the concentration of the dispersion fluid is low. Furthermore, the haze tends to decrease by the thixotropic reduction treatment, and tends to decrease by the defibration treatment after the thixotropic reduction treatment.

The fibrous cellulose dispersion fluid may contain other additives, in addition to the solvent containing water and the microfibrous cellulose. Examples of other additives include an antifoaming agent, a lubricant, a UV absorber, a dye, a pigment, a stabilizer, a surfactant, and a preservative (e.g., phenoxyethanol). Further, the fibrous cellulose dispersion fluid may contain a hydrophilic polymer, an organic ion or the like as an optional component.

The hydrophilic polymer is preferably a hydrophilic oxygen-containing organic compound (in which the cellulose fibers are excluded), and examples of the oxygen-containing organic compound include hydrophilic polymers such as polyethyleneglycol, polyethyleneoxide, casein, dextrin, starch, modified starch, polyvinylalcohol, modified polyvinylalcohol (acetoacetylated polyvinylalcohol, etc.), polyethyleneoxide, polyvinylpyrrolidone, polyvinylmethylether, polyacrylic acid salts, acrylic acid alkyl ester copolymers, urethane-based copolymers, and cellulose derivatives (hydroxyethylcellulose, carboxyethylcellulose, carboxymethylcellulose, etc.); and hydrophilic small molecules such as glycerin, sorbitol, and ethyleneglycol.

Examples of the organic ion include a tetraalkylammonium ion or a tetraalkylphosphonium ion. Examples of the tetraalkylammonium ion include a tetramethylammonium ion, a tetraethylammonium ion, a tetrapropylammonium ion, a tetrabutylammonium ion, a tetrapentylammonium ion, a tetrahexylammonium ion, a tetraheptylammonium ion, a tributylmethylammonium ion, a lauryltrimethylammonium ion, a cetyltrimethylammonium ion, a stearyltrimethylammonium ion, an octyldimethylethylammonium ion, a lauryldimethylethylammonium ion, a didecyldimethylammonium ion, a lauryldimethylbenzylammonium ion, and a tributylbenzylammonium ion. Examples of the tetraalkylphosphonium ion include a tetramethylphosphonium ion, a tetraethylphosphonium ion, a tetrapropylphosphonium ion, a tetrabutylphosphonium ion, and a lauryltrimethylphosphonium ion. In addition, as the tetrapropylonium ion and the tetrabutylonium ion, a tetra n-propylonium ion and a tetra n-butylonium ion may be exemplified, respectively.

(Use)

It is preferable that the microfibrous cellulose of the present embodiment is used as a thickener for various purposes. For example, the microfibrous cellulose of the present embodiment may be used as an additive for food, cosmetics, cement, paint (e.g., for painting vehicles such as automobiles, ship, and aircrafts, for building materials, and for daily necessaries), inks, pharmaceuticals, etc. Further, the microfibrous cellulose of the present embodiment may also be applicable to daily necessaries by being added to a resin-based material or a rubber-based material. Among them, the microfibrous cellulose of the present embodiment is particularly preferably microfibrous cellulose for paint.

[Fibrous Cellulose-Containing Dispersion]

The present embodiment also relates to a fibrous cellulose-containing dispersion fluid described herein below.

The fibrous cellulose-containing dispersion fluid of the present embodiment is a fibrous cellulose-containing dispersion fluid in which the fibrous cellulose has a fiber width of 1,000 nm or less and has an ionic substituent, the amount of ionic substituent in the fibrous cellulose is 0.10 mmol/g or more and 1.50 mmol/g or less, the polymerization degree of the fibrous cellulose is 150 or more and 515 or less, the viscosity at 3 rpm of the B-type viscometer is 40,000 mPa·s or more and 800,000 mPa·s or less, and the concentration of the fibrous cellulose in the dispersion fluid is 1.5% by mass or more and less than 5% by mass.

The fibrous cellulose-containing dispersion fluid of the present embodiment can exhibit the excellent dispersion stability in a pigment or the like and the excellent coating suitability, when added to paint.

The dispersion fluid in which the microfibrous cellulose of the present embodiment is dispersed has the thixotropy controlled to an appropriate range, and thus, can exhibit the excellent coating suitability.

The fibrous cellulose-containing dispersion fluid of the present embodiment is preferably a dispersion fluid obtained by dispersing fibrous cellulose in a solvent containing water, and more preferably an aqueous dispersion fluid containing microfibrous cellulose dispersed in water.

In addition to water, acetone, methanol, ethanol, isopropanol, etc., which is a water miscible organic solvent may be contained, but the content thereof is preferably 30% by mass or less of the total amount of the solvents, more preferably 10% by mass or less, still more preferably 5% by mass or less, and yet still more preferably 3% by mass or less, and the absence thereof (0% by mass) is particularly preferable.

The fibrous cellulose-containing dispersion fluid of the present embodiment is preferably used for paint, and can impart the excellent dispersibility in a pigment or the like, thereby improving the coating suitability of paint as described above. Further, the fibrous cellulose-containing dispersion fluid of the present embodiment has excellent effects in transparency and appearance, and also has the effect of the excellent defoaming performance.

When the microfibrous cellulose-containing dispersion fluid of the present embodiment is used as an additive of paint, the smoothness or design of a coating film after a coating can be improved. Specifically, in the present embodiment, a coating film having a smooth surface can be obtained. The smoothness of the coating film may be evaluated by a surface roughness (Ra) of the coating film, and when the surface roughness (Ra) of the coating film is 0.30 μm or less, it can be evaluated that the surface is smooth. The surface roughness (Ra) of the coating film is a value obtained when an arithmetic average roughness (Ra) of a cured coating film is measured over a measurement range of 470.92 μm×353.16 μm by using an optical interference non-contact surface profile measuring device (non-contact surface layer cross-section profile measurement system VertScan 2.0, Model: R5500GML, manufactured by Ryoka Systems Inc.) with a ×10 object lens.

When the microfibrous cellulose-containing dispersion fluid of the present embodiment is used as an additive of paint, a generation of aggregates in a coating film may also be suppressed. Thus, the design of the coating film to be obtained can be improved. Further, when the generation of aggregates in the coating film is suppressed, the smoothness or strength of the coating film can also be improved.

The content of the microfibrous cellulose in the fibrous cellulose-containing dispersion fluid is 1.5% by mass or more relative to the total mass of the fibrous cellulose-containing dispersion fluid, preferably 1.8% by mass or more, more preferably 2.0% by mass or more, still more preferably more than 2.0% by mass, and yet still more preferably 2.1% by mass or more. Further, the content of the microfibrous cellulose is less than 5.0% by mass relative to the total mass of the fibrous cellulose dispersion fluid, preferably 4.5% by mass or less, more preferably 4.0% by mass or less, still more preferably 3.5% by mass or less, yet still more preferably 3.0% by mass or less, even yet still more preferably less than 3.0% by mass, and particularly preferably 2.9% by mass or less.

When the content of the microfibrous cellulose falls within the ranges described above, the handling during the preparation of the fibrous cellulose-containing dispersion fluid is excellent, and further, the fibrous cellulose-containing dispersion fluid having a desired concentration can be obtained without performing a concentration step, which is preferable. Furthermore, the dispersibility of the microfibrous cellulose in the dispersion fluid is excellent, and the dispersion fluid excellent in transparency can be obtained, which is preferable.

The viscosity ($\eta_{ß}'2$) of the fibrous cellulose-containing dispersion fluid at a rotation speed of 3 rpm of the B-type viscometer is 40,000 mPa·s or more, preferably 100,000 mPa·s or more, more preferably 150,000 mPa·s or more, and still more preferably 180,000 mPa·s or more, from the viewpoint of the fiber dispersibility or particle dispersibility of the dispersion fluid. Further, from the viewpoint of improving the defoaming performance or suppressing the generation of coating film aggregates, the viscosity ($\eta_{ß}'2$) is 800,000 mPa·s or less, preferably 380,000 mPa·s or less, more preferably 350,000 mPa·s or less, and still more preferably 300,000 mPa·s or less. Details of the measurement conditions for the viscosity ($\eta_{ß}'2$) of the fibrous cellulose-containing dispersion fluid are the measurement conditions described in Examples.

The viscosity ($\eta_{ß}'1$) of the fibrous cellulose-containing dispersion fluid at a rotation speed of 0.3 rpm of the B-type viscometer is preferably 300,000 mPa or more, more preferably 700,000 mPa·s or more, still more preferably 1,000,000 mPa·s or more, yet still more preferably 1,200,000 mPa·s or more, and particularly preferably 1,280,000 mPa·s or more, from the viewpoint of the fiber dispersibility or particle dispersibility of the dispersion fluid. Further, from the viewpoint of improving the defoaming performance or suppressing the generation of coating film aggregates, the viscosity ($\eta_{ß}'1$) is preferably 5,000,000 mPa·s or less, more preferably 3,500,000 mPa·s or less, still more preferably 2,800,000 mPa·s or less, yet still more preferaly 2,300,000 mPa·s or less, and particularly preferably 2,000,000 mPa·s or less. Details of the measurement conditions for the viscosity ($\eta_{ß}'1$) of the fibrous cellulose-containing dispersion fluid are the measurement conditions described in Examples.

As for the viscosity ratio of the fibrous cellulose-containing dispersion fluid, the ratio of the viscosity at the rotation speed of 0.3 rpm of the B-type viscometer to the viscosity at the rotation speed of 3 rpm of the B-type viscometer (i.e., $\eta_{ß}'1/\eta_{ß}'2$) is preferably 5.00 or more, more preferably 6.00 or more, still more preferably 6.50 or more, and yet still more preferably 6.70 or more, from the viewpoint of obtaining the appropriate thixotropy. Further, from the viewpoint of improving the coating suitability or suppressing the generation of coating film aggregates, the viscosity ratio is preferably 7.40 or less, more preferably 7.30 or less, still more preferably 7.00 or less, and yet still more preferably 6.90 or less.

As for the viscosity of the fibrous cellulose-containing dispersion fluid, the viscosity ($\eta_{\alpha}'1$) under a condition of a shear rate of 1 $sec^{-1}$ in a rheometer is preferably 30 Pa·s or more, more preferably 50 Pa·s or more, still more preferably 70 Pa·s or more, and yet still more preferably 80 Pa·s or more, from the viewpoint of the fiber dispersibility or particle dispersibility of the dispersion fluid. Further, from the viewpoint of improving the defoaming performance or suppressing the generation of coating film aggregates, the viscosity ($\eta_{\alpha}'1$) is preferably 400 Pa·s or less, more preferably 250 Pa·s or less, still more preferably 180 Pa·s or less, yet still more preferably 160 Pa·s or less, and even yet still more preferably 130 Pa·s or less. Details of the measurement conditions for the viscosity ($\eta_{\alpha}'1$) of the fibrous cellulose dispersion fluid are the measurement conditions described in Examples.

As for the viscosity of the fibrous cellulose dispersion fluid, the viscosity ($\eta_{\alpha}'2$) under a condition of a shear rate of 1,000 $sec^{-1}$ in a rheometer is preferably 0.02 Pa·s or more, more preferably 0.06 Pa·s or more, still more preferably 0.10 Pa·s or more, yet still more preferably 0.15 Pa·s or more, and particularly preferably 0.17 Pa·s or more, from the viewpoint of the fiber dispersibility or particle dispersibility of the dispersion fluid. Further, from the viewpoint of improving the defoaming performance or suppressing the generation of coating film aggregates, the viscosity ($\eta_\alpha$'2) is preferably 1.00 Pa·s or less, more preferably 0.65 Pa·s or less, still more preferably 0.50 Pa·s or less, yet still more preferably 0.30 Pa·s or less, even yet still more preferably 0.27 Pa·s or less, and particularly preferably 0.26 Pa·s or less. Details of the measurement conditions for the viscosity ($\eta_\alpha$'2) of the fibrous cellulose-containing dispersion fluid are the measurement conditions described in Examples.

As for the viscosity ratio of the fibrous cellulose dispersion fluid, the ratio of the viscosity ($\eta_\alpha$'1) under the condition of the shear rate of 1 $sec^{-1}$ in the rheometer to the viscosity ($\eta_\alpha$'2) under the condition of the shear rate of 1,000 $sec^{-1}$ in the rheometer (i.e., $\eta_\alpha$'1/$\eta_\alpha$'2) is preferably 200 or more, more preferably 300 or more, still more preferably 400 or more, yet still more preferably 450 or more, and particularly preferably 470 or more, from the viewpoint of obtaining the appropriate thixotropy. Further, from the viewpoint of improving the coating suitability or suppressing the coating film aggregates, the viscosity ratio is preferably 1,000 or less, more preferably 700 or less, still more preferably 600 or less, and yet still more preferably 500 or less.

In the present embodiment, when the fibrous cellulose-containing dispersion fluid is dispersed with a dispersion solvent containing water and isopropanol to obtain a dispersion fluid in which a mass ratio of water and isopropanol is 7:3 and the viscosity at 23° C. is 2,500 mPa s, and the dispersion fluid is stirred under the following stirring conditions, the viscosity change rate preferably falls within ±50%. In this specification and the present embodiment, the range "within ±50%" indicates "−50% or more and +50% or less".

(Stirring Conditions)

The dispersion fluid having the viscosity of 2,500 mPa·s at 23° C. is poured into a cylindrical container having a diameter of 10 cm to a height of 5 cm, and is stirred at 23° C. for 24 hours by using an elliptical stirrer having a length of 5 cm, a center width of 2 cm, and an end width of 1 cm, while maintaining a 2 cm-recessed state at the center of a fluid surface. In general, in many cases, the viscosity change rate of a dispersion fluid decreases due to an application of shear to the dispersion fluid, and thus, the viscosity change rate calculated by the formula above becomes a negative value. That is, the viscosity change rate of the dispersion fluid is more preferably −50% or more and 0% or less.

From the viewpoint of achieving both the low viscosity change rate and the viscosity adjusting ability by the addition of the microfibrous cellulose, thereby providing the fibrous cellulose-containing dispersion fluid which is excellent in defoaming performance and particle dispersibility when contained in paint, the viscosity change rate of the dispersion fluid calculated by the formula above is more preferably −40% or more, still more preferably −35% or more, yet still more preferably −30% or more, even yet still more preferably −5% or less, even still more further preferably −10% or less, even yet still more further preferably −15% or less, and particularly preferably −18% or less.

The viscosity change rate of the dispersion fluid calculated by the formula above is achieved by individually controlling, for example, a type or condition of a treatment performed on the microfibrous cellulose, a polymerization degree of the microfibrous cellulose, an amount of ionic substituent, etc., within appropriate ranges.

Details of the measurement of the viscosity change rate described above are the same as the measurement of the viscosity change rate described in [Fibrous Cellulose], and the appropriate ranges thereof are also the same as described therein.

When the dispersion fluid for measuring the viscosity before/after a stirring is prepared, the fibrous cellulose is dispersed in the dispersion solvent containing water and isopropanol. Here, it is preferable that the fibrous cellulose-containing dispersion fluid is an aqueous dispersion fluid, and in this case, it is preferable to add water to the fibrous cellulose-containing dispersion fluid as necessary, and then, add isopropanol thereto. When a sufficient amount of water is present in the fibrous cellulose-containing dispersion fluid, only isopropanol may be added. In this way, the dispersion fluid is prepared such that the ratio of the total mass of the water contained in the fibrous cellulose-containing dispersion fluid and the water added as necessary to the mass of the added isopropanol becomes 7:3.

When the fibrous cellulose-containing dispersion fluid is dispersed with water to obtain a dispersion fluid having a microfibrous cellulose concentration of 0.4% by mass, the viscosity of the diluted dispersion fluid at 23° C. is preferably 20 mPa·s or more, more preferably 200 mPa·s or more, still more preferably 300 mPa·s or more, yet still more preferably 350 mPa·s or more, even yet still more preferably 400 mPa·s or more, even still more further preferably 600 mPa·s or more, even yet still more further preferably 1,000 mPa·s or more, particularly preferably 1,500 mPa·s or more, and most preferably 1,900 mPa·s or more, from the viewpoint of functioning as a viscosity modifier when added to paint, thereby improving the dispersibility stability of particles. Further, from the same viewpoint, the viscosity of the dispersion fluid at 23° C. is preferably 4,700 mPa·s or less, more preferably 4,000 mPa·s or less, still more preferably 3,500 mPa·s or less, yet still more preferably 3,000 mPa·s or less, and even yet still more preferably 2,500 mPa s or less. The viscosity of the diluted dispersion fluid with the microfibrous cellulose concentration of 0.4% by mass may be measured by using a B-type viscometer (analog viscometer T-LVT, manufactured by BLOOKFIELD). Under measurement conditions of 23° C. and a rotation speed of 3 rpm, the viscosity after 3 minutes from the start of the measurement is measured.

When the fibrous cellulose-containing dispersion fluid is diluted with water to obtain an aqueous dispersion fluid having a microfibrous cellulose concentration of 0.2% by mass, the haze of the diluted dispersion fluid is preferably 20% or less, more preferably 15% or less, still more preferably 10% or less, and yet still more preferably 9.5% or less. When the haze of the diluted dispersion fluid falls within these ranges, this indicates that the fibrous cellulose-containing dispersion fluid has a high transparency, and the micronization of the microfibrous cellulose is satisfactory. When such a fibrous cellulose-containing dispersion fluid is added to paint, the paint can exhibit the excellent coating suitability. Here, the haze of the fibrous cellulose-containing dispersion fluid (microfibrous cellulose concentration of 0.2% by mass) is a value measured by using the hazemeter (HM-150, manufactured by Murakami Color Research Laboratory, Co., Ltd.) in accordance with JIS K 7136:2000 after the diluted fibrous cellulose dispersion fluid is put in a glass cell for a fluid with an optical path length of 1 cm (MG-40, manufactured by Fujiwara Scientific, an inverse optical path). A zero point measurement is performed with ion exchange water put in the same glass cell.

A fiber width, a fiber length, a crystal structure, and an axial ratio (fiber length/fiber width) of the fibrous cellulose contained in the fibrous cellulose-containing dispersion fluid, a type and an amount of an ionic substituent contained in the fibrous cellulose, and a polymerization degree of the fibrous cellulose are the same as described in [Fibrous Cellulose], and appropriate ranges thereof are also the same as described therein.

Further, the method of producing the fibrous cellulose (the ionic substituent introducing step, the washing step, the alkali treatment step, the acid treatment step, the defibration treatment step, and the thixotropic reduction treatment step) is the same as described in [Fibrous Cellulose], and appropriate ranges thereof are also the same as described therein. The solid content concentration of the microfibrous cellulose at the time of the defibration treatment and the thixotropy reduction treatment is preferably the concentration of the fibrous cellulose-containing dispersion fluid of the present embodiment. It is also referable that the concentration of the cellulose-containing dispersion fluid is the same as the solid content concentration of the cellulose at the time of the defibration treatment and the thixotropy reduction treatment, because steps such as a concentration are not required.

The fibrous cellulose-containing dispersion fluid may contain other additives, in addition to the water-containing solvent and the microfibrous cellulose. Examples of other additives include an antifoaming agent, a lubricant, a UV absorber, a dye, a pigment, a stabilizer, a surfactant, and a preservative (e.g., phenoxyethanol).

(Use)

It is preferable that the fibrous cellulose-containing dispersion fluid of the present embodiment is used as a thickener for various purposes. For example, the fibrous cellulose-containing dispersion fluid of the present embodiment may be used as an additive for food, cosmetics, cement, paint (e.g., for painting vehicles such as automobiles, ship, and aircrafts, for building materials, and for daily necessaries), inks, pharmaceuticals, etc. Further, the fibrous cellulose-containing dispersion fluid of the present embodiment may also be applicable to daily necessaries by being added to a resin-based material or a rubber-based material. Among them, the fibrous cellulose-containing dispersion fluid of the present embodiment is particularly preferably a fibrous cellulose-containing dispersion fluid for paint.

EXAMPLES

Hereinafter, the features of the present invention will be more specifically described with reference to Examples and Comparative Examples. Materials, use amounts, ratios, treatment contents, treatment procedures and the like described in Examples herein below may be appropriately changed without deviating from the gist of the present invention. Thus, the scope of the present invention should not be construed as being limited by specific examples described below.

Production Example 1

[Production of Phosphorylated Microfibrous Cellulose Dispersion Fluid]

As a raw material pulp, a needle leaved tree kraft pulp manufactured by Oji Paper Co., Ltd. (solid content of 93% by mass, sheet form with a basis weight of 208 $g/m^2$, Canadian standard freeness (CSF) measured in accordance with JIS P 8121-2:2012 after a disaggregation is 700 ml) was used.

A phosphorylation treatment was performed on the raw material pulp as follows. First, a mixed aqueous solution of ammonium dihydrogen phosphate and urea was added to 100 parts by mass (absolute dry mass) of the raw material pulp, and was adjusted to set 45 parts by mass of ammonium dihydrogen phosphate, 120 parts by mass of urea, and 150 parts by mass of water, so that a chemical liquid-impregnated pulp was obtained. Then, the obtained chemical liquid-impregnated pulp was heated by a hot air dryer of 140° C. for 200 seconds to introduce a phosphoric acid group into cellulose in the pulp, so that a phosphorylated pulp was obtained.

Next, a washing treatment was performed on the obtained phosphorylated pulp. The washing treatment was performed by repeating an operation of stirring a pulp dispersion fluid, which was obtained by pouring 10 L of ion exchange water into 100 g (absolute dry mass) of the phosphorylated pulp, to uniformly disperse the pulp, and then, performing a filtering and a dehydration. A time point when an electrical conductivity of a filtrate became 100 μS/cm or less was set as the end point of the washing.

Next, a neutralization treatment was performed on the washed phosphorylated pulp as follows. First, the washed phosphorylated pulp was diluted with 10 L of ion exchange water, and then, was stirred while adding a 1 N sodium hydroxide aqueous solution thereto little by little, so that a phosphorylated pulp slurry with pH of 12 to 13 was obtained. Next, the corresponding phosphorylated pulp slurry was dehydrated to obtain a neutralized phosphorylated pulp. Then, the washing treatment described above was performed on the neutralized phosphorylated pulp.

A measurement of an infrared absorption spectrum was performed on the phosphorylated pulp obtained as described above, by using FT-IR. As a result, an absorption based on the phosphoric acid group was observed around 1,230 $cm^{-1}$, which confirmed that the phosphoric acid group was added to the pulp.

Further, when the obtained phosphorylated pulp was provided for a test and subjected to an analysis with an X-ray diffraction device, typical peaks were observed at two positions around 2θ=14° to 17° and around 2θ=22° to 23°, which confirmed that cellulose I-type crystals were included.

Ion exchange water was added to the obtained phosphorylated pulp, to prepare a slurry with a solid content concentration of 2% by mass. This slurry was treated with a wet pulverizing device (STAR BURST, manufactured by Sugino Machine Limited) at a pressure of 200 MPa six times, so that a microfibrous cellulose dispersion fluid containing microfibrous cellulose was obtained.

Through an X-ray diffraction, it was confirmed that the microfibrous cellulose maintained the cellulose I-type crystals. Further, the fiber width of the microfibrous cellulose was measured by using a transmission type electron microscope, and was 3 to 5 nm. The amount of phosphoric acid group (first dissociated acid amount) measured by a measurement method described in [Measurement of Amount of Phosphorus Oxoacid Group] to be described later was 0.80 mmol/g.

Production Example 2

A microfibrous cellulose dispersion fluid was obtained in the same manner as in Production Example 1, except that the chemical liquid-impregnated pulp was dried at 140° C. for 230 seconds during the phosphorylation. The amount of phosphoric acid group (first dissociated acid amount) measured by the measurement method described in [Measurement of Amount of Phosphorus Oxoacid Group] to be described later was 1.00 mmol/g.

Production Example 3

A microfibrous cellulose dispersion fluid was obtained in the same manner as in Production Example 1, except that the chemical-impregnated pulp was dried at 165° C. for 170 seconds during the phophorylation. The amount of phosphoric acid group (first dissociated acid amount) measured by the measurement method described in [Measurement of Amount of Phosphorus Oxoacid Group] to be described later was 1.20 mmol/g.

Production Example 4

A microfibrous cellulose dispersion fluid was obtained in the same manner as in Production Example 1, except that the chemical liquid-impregnated pulp was dried at 165° C. during the phophorylation. The amount of phosphoric acid group (first dissociated acid amount) measured by the measurement method described in [Measurement of Amount of Phosphorus Oxoacid Group] to be described later was 1.45 mmol/g.

Production Example 5

A microfibrous cellulose dispersion fluid was obtained in the same manner as in Production Example 4, except that the phosphorylation treatment and the washing treatment were performed in this order once more on the washed phosphorylated pulp before the neutralization treatment. The amount of phosphoric acid group (first dissociated acid amount) measured by the measurement method described in [Measurement of Amount of Phosphorus Oxoacid Group] to be described later was 2.00 mmol/g.

Production Example 6

[Production of Sub-Phosphorylated Microfibrous Cellulose Dispersion Fluid]

As a raw material pulp, a needle leaved tree kraft pulp manufactured by Oji Paper (solid content of 93% by mass, sheet form with a basis weight of 245 g/$m^2$, Canadian standard freeness (CSF) measured in accordance with JIS P 8121-2:2012 after a disaggregation is 700 ml) was used.

A phosphorus oxo-oxidation treatment was performed on the raw material pulp as follows. First, a mixed aqueous solution of phosphorous acid (phosphonic acid) and urea was added to 100 parts by mass (absolute dry mass) of the raw material pulp, and was adjusted to set 33 parts by mass of phosphorous acid, 120 parts by mass of urea, and 150 parts by mass of water, so that a chemical liquid-impregnated pulp was obtained. Then, the obtained chemical liquid-impregnated pulp was heated in a hot air dryer at 165° C. for 150 seconds to introduce the phosphorous acid group into cellulose in the pulp, so that a sub-phosphorylated pulp was obtained.

Then, a washing treatment was performed on the obtained sub-phosphorylated pulp. The washing treatment was performed by repeating an operation of stirring a pulp dispersion fluid, which was obtained by pouring 10 L of ion exchange water into 100 g (absolute dry mass) of the sub-phosphorylated pulp, to uniformly disperse the pulp, and then, performing a filtering and a dehydration. The end point of the washing was set to the timing when an electrical conductivity of a filtrate became 100 μS/cm or less.

Next, a neutralization treatment was performed on the washed sub-phosphorylated pulp as follows. First, the washed sub-phosphorylated pulp was diluted with 10 L of ion exchange water, and then, was stirred while adding a 1 N sodium hydroxide aqueous solution thereto little by little, so that a sub-phosphorylated pulp slurry with pH of 12 to 13 was obtained. Next, the corresponding sub-phosphorylated pulp slurry was dehydrated to obtain a neutralized sub-phosphorylated pulp. Then, the washing treatment described above was performed on the neutralized sub-phosphorylated pulp.

A measurement of an infrared absorption spectrum was performed on the sub-phosphorylated pulp obtained as described above, by using FT-IR. As a result, an absorption based on P=O of the phosphonic acid group which is a tautomer of the phosphorous acid group was observed around 1,210 $cm^{-1}$, which confirmed that the phosphorous acid group (phosphonic acid group) was added to the pulp. Further, when the obtained sub-phosphorylated pulp was provided for a test and subjected to an analysis with an X-ray diffraction device, typical peaks were observed at two positions around 2θ=14° to 17° and around 2θ=22° to 23°, which confirmed that cellulose I-type crystals were included.

Ion exchange water was added to the obtained sub-phosphorylated pulp to prepare a slurry with a solid content concentration of 2% by mass. This slurry was treated with a wet pulverizing device (STAR BURST, manufactured by Sugino Machine Limited) at a pressure of 200 MPa six times, so that a microfibrous cellulose dispersion fluid containing microfibrous cellulose was obtained.

Through an X-ray diffraction, it was confirmed that the microfibrous cellulose maintained the cellulose I-type crystals. Further, the fiber width of the microfibrous cellulose was measured by using a transmission type electron microscope, and was 3 to 5 nm. The amount of phosphorous acid group (first dissociated acid amount) measured by the measurement method described in [Measurement of Amount of Phosphorus Oxoacid Group] to be described later was 0.74 mmol/g.

Production Example 7

A microfibrous cellulose dispersion fluid was obtained in the same manner as in Production Example 6, except that the chemical liquid-impregnated pulp was heated for 220 seconds during the sub-phosphorylation. The amount of phosphorous acid group (first dissociated acid amount) measured by the measurement method described in [Measurement of Amount of Phosphorus Oxoacid Group] to be described later was 1.41 mmol/g.

Production Example 8

A microfibrous cellulose dispersion fluid was obtained in the same manner as in Production Example 6, except that the chemical liquid-impregnated pulp was heated for 400 seconds during the sub-phosphorylation. The amount of phosphorous acid group (first dissociated acid amount) measured by the measurement method described in [Measurement of Amount of Phosphorus Oxoacid Group] to be described later was 1.86 mmol/g.

Production Example 9

A sulfated pulp was obtained in the same manner as in Production Example 6, except that 38 parts by mass of amidosulfuric acid (sulfamic acid) was used, instead of phosphorous acid (phosphonic acid), and the heating time was extended to 13 minutes.

A measurement of an infrared absorption spectrum was measured on the sulfated pulp obtained as described above, by using FT-IR. As a result, an absorption based on the sulfuric acid group was observed around 1,220 to 1,260 $cm^{-1}$, which confirmed that the sulfuric acid group was added to the pulp.

Further, when the obtained sulfated pulp was provided for a test and subjected to an analysis with an X-ray diffraction device, typical peaks were observed at two positions around 2θ=14° to 17° and around 2θ=22° to 23°, which confirmed that cellulose I-type crystals were included. Ion exchange water was added to the obtained sulfated pulp, and a stirring was performed to obtain a 2% by mass of slurry. This slurry was treated with a wet pulverizing device (STAR BURST, manufactured by Sugino Machine Limited) at a pressure of 200 Mpa six times, so that a microfibrous cellulose-containing slurry containing microfibrous cellulose was obtained.

Through an X-ray diffraction, it was confirmed that the microfibrous cellulose maintained the cellulose I-type crystals. Further, the fiber width of the microfibrous cellulose was measured by using a transmission type electron microscope, and was 3 to 5 nm. The amount of sulfuric acid group (sulfonic acid group) measured by a measurement method described in [Measurement of Amount of Sulfur Oxoacid Group] to be described later was 0.88 mmol/g.

Production Example 10

[Production of TEMPO Oxidized Microfibrous Cellulose Dispersion Fluid]

As a raw material pulp, a needle leaved tree kraft pulp (undried) manufactured by Oji Paper Co., Ltd., was used. An alkali TEMPO oxidation treatment was performed on the raw material as follows. First, the raw material pulp equivalent to 100 parts by mass (dry mass), 1.6 parts by mass of TEMPO (2,2,6,6-tetramethylpiperidine-1-oxyl), and 10 parts by mass of sodium bromide were dispersed in 10,000 parts by mass of water. Then, 13% by mass of a sodium hypochlorite aqueous solution was added to 1.0 g of the pulp up to 1.3 mmol, and the reaction was started. During the reaction, a 0.5 M sodium hydroxide aqueous solution was added dropwise so that pH was maintained at 10 to 10.5, and then a time point when no change occurred in pH was considered as the end of the reaction.

Next, a washing treatment was performed on the obtained TEMPO oxidized pulp. The washing treatment was performed by repeating an operation of dehydrating the TEMPO oxidized pulp slurry to obtain a dehydrated sheet, then, pouring 5,000 parts by mass of ion exchange water thereinto, performing a stirring for uniform dispersion, and then, performing a filtration and a dehydration. A time point when an electrical conductivity of a filtrate became 100 μS/cm or less was set as the end point of the washing.

An additional oxidation treatment of a remaining aldehyde group was performed on the dehydrated sheet as follows. The dehydrated sheet equivalent to 100 parts by mass (dry mass) was dispersed in 10,000 parts by mass of 0.1 mol/L acetic acid buffer (pH 4.8). Then, after 113 parts by mass of 80% sodium chlorite was added, and a sealing was immediately performed, a reaction was caused at room temperature for 48 hours while performing a stirring by using a magnetic stirrer at 500 rpm, so that a pulp slurry was obtained.

Next, a washing treatment was performed on the obtained TEMPO oxidized pulp that had been subjected to the additional oxidation. The washing treatment was performed by repeating an operation of dehydrating the additionally oxidized pulp slurry to obtain a dehydrated sheet, then, pouring 5,000 parts by mass of ion exchange water thereinto, performing a stirring for uniform dispersion, and then, performing a filtration and dehydration. A time point when an electrical conductivity of a filtrate became 100 μS/cm or less was set as the end point of the washing.

Further, when the obtained TEMPO oxidized pulp was provided for a test and subjected to an analysis with an X-ray diffraction device, typical peaks were observed at two positions around 2θ=14° to 17° and around 2 θ=22° to 23°, which confirmed that cellulose I-type crystals were included.

Ion exchange water was added to the obtained TEMPO oxidized pulp to prepare a slurry with a solid content concentration of 2% by mass. This slurry was treated with a wet pulverizing device (STAR BURST, manufactured by Sugino Machine Limited) at a pressure of 200 MPa six times, so that a microfibrous cellulose dispersion fluid containing microfibrous cellulose was obtained.

Through an X-ray diffraction, it was confirmed that the microfibrous cellulose maintained the cellulose I-type crystals. Further, the fiber width of the microfibrous cellulose was measured by using a transmission type electron microscope, and was 3 to 5 nm. The amount of carboxy group measured by a measuring method to be described later was 0.70 mmol/g.

Production Example 11

A microfibrous cellulose dispersion fluid was obtained in the same manner as in Production Example 1, except that the chemical liquid-impregnated pulp was heated for 180 seconds during the phophorylation. The amount of phosphoric acid group (first dissociated acid amount) measured by the measurement method described in [Measurement of Amount of Phosphorus Oxoacid Group] to be described later was 0.60 mmol/g.

Production Example 12

A microfibrous cellulose dispersion fluid was obtained in the same manner as in Production Example 1, except that the chemical liquid-impregnated pulp was heated for 220 seconds during the phophorylation. The amount of phosphoric acid group (first dissociated acid amount) measured by the measurement method described in [Measurement of Amount of Phosphorus Oxoacid Group] to be described later was 0.95 mmol/g.

Production Example 13

A microfibrous cellulose dispersion fluid was obtained in the same manner as in Production Example 9, except that the chemical liquid-impregnated pulp was heated for 15 minutes during the sulfation. The amount of sulfuric acid group (sulfonic acid group) measured by the measurement method described in [Measurement of Amount of Sulfur Oxoacid Group] to be described later was 0.94 mmol/g.

Production Example 14

A microfibrous cellulose dispersion fluid was obtained in the same manner as in Production Example 1, except that the solid content concentration during the defibration treatment was 2.4% by mass.

Production Example 15

A microfibrous cellulose dispersion fluid was obtained in the same manner as in Production Example 1, except that the solid content concentration during the defibration treatment was 2.9% by mass.

Production Example 16

A microfibrous cellulose dispersion fluid was obtained in the same manner as in Production Example 1, except that the solid content concentration during the defibration treatment was 4.0% by mass, and the treatment in the wet pulverizing device was performed once.

Production Example 17

A microfibrous cellulose dispersion fluid was obtained in the same manner as in Production Example 1, except that the solid content concentration during the defibration treatment was 4.9% by mass, and the treatment in the wet pulverizing device was performed once.

Production Example 18

A microfibrous cellulose dispersion fluid was obtained in the same manner as in Production Example 1, except that the solid content concentration during the defibration treatment was 12.0% by mass, and the treatment in the wet pulverizing device was performed once.

Example 1

(Thixotropy Reduction by Ozone Treatment)

2 L of an ozone/oxygen mixed gas having an ozone concentration of 200 g/$m^3$ was added to 1,000 g of the microfibrous cellulose dispersion fluid (solid content concentration 2% by mass, solid content 20 g) obtained in Production Example 1, and the mixture was stirred in a sealed container at 25° C. for 2 minutes and allowed to stand still for 60 minutes. Here, the ozone addition rate was $2.0\times10^{-2}$ g relative to 1 g of the microfibrous cellulose. Then, the container was opened, and a stirring was performed for 5 hours to volatilize remaining ozone in the dispersion fluid. Then, a treatment with a high-pressure homogenizer was performed at a pressure of 200 Mpa three times, to obtain a microfibrous cellulose dispersion fluid. In this manner, a thixotropy reduction of the microfibrous cellulose was performed, and on the obtained thixotropy-reduced microfibrous cellulose dispersion fluid, the viscosity, the polymerization degree, the viscosity change rate, the fiber width, the fiber length, and the haze were measured by a method to be described later. As a result of the thixotropic reduction treatment, there was no change in amount of the ionic substituent in the microfibrous cellulose. In the Examples below as well, there was no change in amount of the ionic substituent in the microfibrous cellulose.

Example 2

2 L of an ozone/oxygen mixed gas having an ozone concentration of 200 g/$m^3$ was added to 1,000 g of the microfibrous cellulose dispersion fluid (solid content concentration 2% by mass, solid content 20 g) obtained in Production Example 1, and the mixture was stirred in a sealed container at 25° C. for 2 minutes and allowed to stand still for 60 minutes. Here, the ozone addition rate was $2.0\times10^{-2}$ g relative to 1 g of the microfibrous cellulose. Then, the container was opened, and a stirring was performed for 5 hours to volatilize remaining ozone in the dispersion fluid. In this manner, a thixotropy reduction of the microfibrous cellulose was performed, and on the obtained thixotropy-reduced microfibrous cellulose dispersion fluid, the viscosity, the polymerization degree, the viscosity change rate, the fiber width, the fiber length, and the haze were measured by a method to be described later.

Example 3

(Thixotropy Reduction by Ozone Treatment)

1 L of an ozone/oxygen mixed gas having an ozone concentration of 200 g/$m^3$ was added to 1,000 g of the microfibrous cellulose dispersion fluid (solid content concentration 2% by mass, solid content 20 g) obtained in Production Example 1, and the mixture was stirred in a sealed container at 25° C. for 2 minutes and allowed to stand still for 30 minutes. Here, the ozone addition rate was $1.0\times10^{-2}$ g relative to 1 g of the microfibrous cellulose. Then, the container was opened, and a stirring was performed for 5 hours to volatilize remaining ozone in the dispersion fluid. In this manner, a thixotropy reduction of the microfibrous cellulose was performed, and on the obtained thixotropy-reduced microfibrous cellulose dispersion fluid, the viscosity, the polymerization degree, the viscosity change rate, the fiber width, the fiber length, and the haze were measured by a method to be described later.

Example 4

A thixotropy-reduced microfibrous cellulose dispersion fluid was obtained in the same manner as in Example 3, except that an ozone/oxygen mixed gas with an ozone concentration of 40 g/$m^3$ was used. Here, the ozone addition rate was $2.0\times10^{-3}$ g relative to 1 g of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 5

(Thixotropy Reduction by Enzyme Treatment)

20 g of an enzyme-containing liquid (ECOPULP R, manufactured by AB Enzymes, enzyme content is about 5% by mass) which had been diluted 1,000 times was added to 1,000 g of the microfibrous cellulose dispersion fluid (solid content concentration 2% by mass, solid content 20 g) obtained in Production Example 1, and a stirring was performed at a temperature of 50° C. for 1 hour. Here, the enzyme addition rate was about $5.0\times10^{-5}$ g relative to 1 g of the microfibrous cellulose. Then, a stirring was performed at a temperature of 100° C. for 1 hour to inactivate the enzyme. On the obtained thixotropy-reduced microfibrous cellulose dispersion fluid, the viscosity, the polymerization degree, the viscosity change rate, the fiber width, the fiber length, and the haze were measured by a method to be described later.

Example 6

A thixotropy-reduced microfibrous cellulose dispersion fluid was obtained in the same manner as in Example 5, except that 4 g of the enzyme-containing liquid (ECOPULP R, manufactured by AB Enzymes, enzyme content is about 5% by mass) that has been diluted 1,000 times was added to 1,000 g of the microfibrous cellulose dispersion fluid (solid content concentration 2% by mass, solid content 20 g). Here, the enzyme addition rate was $1.0\times10^{-5}$ g relative to 1 g of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 7

(Thixotropy Reduction by Sodium Hypochlorite Treatment)

170 g of a sodium hypochlorite solution (effective chlorine concentration 12% by mass) was added to 1,000 g of the microfibrous cellulose dispersion fluid (solid content concentration 2% by mass, solid content 20 g) obtained in Production Example 1, and a stirring was performed at room temperature for 1 hour. Here, the addition rate of sodium hypochlorite was 1.02 g relative to 1 g of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 8

A thixotropy-reduced microfibrous cellulose dispersion fluid was obtained in the same manner as in Example 7, except that 1.70 g of the sodium hypochlorite solution (effective chlorine concentration 12% by mass) was added to 1,000 g of the microfibrous cellulose dispersion fluid (solid content concentration 2% by mass, solid content 20 g). Here, the addition rate of sodium hypochlorite was $1.02\times10^{-2}$ parts by mass relative to 1 part by mass of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 9

(Thixotropy Reduction by Sub-Critical Water Treatment)

The microfibrous cellulose dispersion fluid obtained in Production Example 1 was put in a reactor, and was heated for 10 seconds while the temperature was raised to 200° C. Here, the pressure in the reactor was 20 MPa. After the completion of the heating, the reactor was water-cooled, and then, the thixotropy-reduced microfibrous cellulose dispersion fluid in the reactor was recovered. On the obtained thixotropy-reduced microfibrous cellulose dispersion fluid, the viscosity, the polymerization degree, the viscosity change rate, the fiber width, the fiber length, and the haze were measured by a method to be described later.

Example 10

A thixotropy-reduced microfibrous cellulose dispersion fluid was obtained in the same manner as in Example 9, except that the heating time was 1 second. On the obtained thixotropy-reduced microfibrous cellulose dispersion fluid, the viscosity, the polymerization degree, the viscosity change rate, the fiber width, the fiber length, and the haze were measured by a method to be described later.

Example 11

A thixotropy-reduced microfibrous cellulose dispersion fluid was obtained in the same manner as in Example 1, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 12

A thixotropy-reduced microfibrous cellulose dispersion fluid was obtained in the same manner as in Example 2, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 13

A thixotropy-reduced microfibrous cellulose dispersion fluid was obtained in the same manner as in Example 3, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 14

A thixotropy-reduced microfibrous cellulose dispersion fluid was obtained in the same manner as in Example 4, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 15

A thixotropy-reduced microfibrous cellulose dispersion fluid was obtained in the same manner as in Example 5, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 16

A thixotropy-reduced microfibrous cellulose dispersion fluid was obtained in the same manner as in Example 6, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 17

A thixotropy-reduced microfibrous cellulose dispersion fluid was obtained in the same manner as in Example 7, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 18

A thixotropy-reduced microfibrous cellulose dispersion fluid was obtained in the same manner as in Example 8, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 19

A thixotropy-reduced microfibrous cellulose dispersion fluid was obtained in the same manner as in Example 9, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 20

A thixotropy-reduced microfibrous cellulose dispersion fluid was obtained in the same manner as in Example 10, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Example 21

A thixotropy-reduced microfibrous cellulose dispersion fluid was obtained in the same manner as in Example 3, except that the microfibrous cellulose dispersion fluid obtained in Production Example 2 was used. On the obtained thixotropy-reduced microfibrous cellulose dispersion fluid, the viscosity, the polymerization degree, the viscosity change rate, the fiber width, the fiber length, and the haze were measured by a method to be described later.

Example 22

A thixotropy-reduced microfibrous cellulose dispersion fluid was obtained in the same manner as in Example 3, except that the microfibrous cellulose dispersion fluid obtained in Production Example 3 was used. On the obtained thixotropy-reduced microfibrous cellulose dispersion fluid, the viscosity, the polymerization degree, the viscosity change rate, the fiber width, the fiber length, and the haze were measured by a method to be described later.

Example 23

A thixotropy-reduced microfibrous cellulose dispersion fluid was obtained in the same manner as in Example 3, except that the microfibrous cellulose dispersion fluid obtained in Production Example 4 was used. On the obtained thixotropy-reduced microfibrous cellulose dispersion fluid, the viscosity, the polymerization degree, the viscosity change rate, the fiber width, the fiber length, and the haze were measured by a method to be described later.

Example 24

A thixotropy-reduced microfibrous cellulose dispersion fluid was obtained in the same manner as in Example 3, except that the microfibrous cellulose dispersion fluid obtained in Production Example 7 was used. On the obtained thixotropy-reduced microfibrous cellulose dispersion fluid, the viscosity, the polymerization degree, the viscosity change rate, the fiber width, the fiber length, and the haze were measured by a method to be described later.

Example 25

A thixotropy-reduced microfibrous cellulose dispersion fluid was obtained in the same manner as in Example 3, except that the microfibrous cellulose dispersion fluid obtained in Production Example 9 was used. On the obtained thixotropy-reduced microfibrous cellulose dispersion fluid, the viscosity, the polymerization degree, the viscosity change rate, the fiber width, the fiber length, and the haze were measured by a method to be described later.

Example 26

A thixotropy-reduced microfibrous cellulose dispersion fluid was obtained in the same manner as in Example 3, except that the microfibrous cellulose dispersion fluid obtained in Production Example 10 was used. On the obtained thixotropy-reduced microfibrous cellulose dispersion fluid, the viscosity, the polymerization degree, the viscosity change rate, the fiber width, the fiber length, and the haze were measured by a method to be described later.

Example 27

A thixotropy-reduced microfibrous cellulose dispersion fluid was obtained in the same manner as in Example 4, except that the microfibrous cellulose dispersion fluid obtained in Production Example 11 was used. On the obtained thixotropy-reduced microfibrous cellulose dispersion fluid, the viscosity, the polymerization degree, the viscosity change rate, the fiber width, the fiber length, and the haze were measured by a method to be described later.

Example 28

A thixotropy-reduced microfibrous cellulose dispersion fluid was obtained in the same manner as in Example 6, except that the microfibrous cellulose dispersion fluid obtained in Production Example 11 was used. On the obtained thixotropy-reduced microfibrous cellulose dispersion fluid, the viscosity, the polymerization degree, the viscosity change rate, the fiber width, the fiber length, and the haze were measured by a method to be described later.

Example 29

A thixotropy-reduced microfibrous cellulose dispersion fluid was obtained in the same manner as in Example 8, except that the microfibrous cellulose dispersion fluid obtained in Production Example 11 was used. On the obtained thixotropy-reduced microfibrous cellulose dispersion fluid, the viscosity, the polymerization degree, the viscosity change rate, the fiber width, the fiber length, and the haze were measured by a method to be described later.

Example 30

A thixotropy-reduced microfibrous cellulose dispersion fluid was obtained in the same manner as in Example 10, except that the microfibrous cellulose dispersion fluid obtained in Production Example 11 was used. On the obtained thixotropy-reduced microfibrous cellulose dispersion fluid, the viscosity, the polymerization degree, the viscosity change rate, the fiber width, the fiber length, and the haze were measured by a method to be described later.

Example 31

A thixotropy-reduced microfibrous cellulose dispersion fluid was obtained in the same manner as in Example 4, except that the microfibrous cellulose dispersion fluid obtained in Production Example 12 was used. On the obtained thixotropy-reduced microfibrous cellulose dispersion fluid, the viscosity, the polymerization degree, the viscosity change rate, the fiber width, the fiber length, and the haze were measured by a method to be described later.

Example 32

A thixotropy-reduced microfibrous cellulose dispersion fluid was obtained in the same manner as in Example 6, except that the microfibrous cellulose dispersion fluid obtained in Production Example 12 was used. On the obtained thixotropy-reduced microfibrous cellulose dispersion fluid, the viscosity, the polymerization degree, the viscosity change rate, the fiber width, the fiber length, and the haze were measured by a method to be described later.

Example 33

A thixotropy-reduced microfibrous cellulose dispersion fluid was obtained in the same manner as in Example 8, except that the microfibrous cellulose dispersion fluid obtained in Production Example 12 was used. On the obtained thixotropy-reduced microfibrous cellulose dispersion fluid, the viscosity, the polymerization degree, the viscosity change rate, the fiber width, the fiber length, and the haze were measured by a method to be described later.

Example 34

A thixotropy-reduced microfibrous cellulose dispersion fluid was obtained in the same manner as in Example 10, except that the microfibrous cellulose dispersion fluid obtained in Production Example 12 was used. On the obtained thixotropy-reduced microfibrous cellulose dispersion fluid, the viscosity, the polymerization degree, the viscosity change rate, the fiber width, the fiber length, and the haze were measured by a method to be described later.

Example 35

A thixotropy-reduced microfibrous cellulose dispersion fluid was obtained in the same manner as in Example 4, except that the microfibrous cellulose dispersion fluid obtained in Production Example 14 was used. On the obtained thixotropy-reduced microfibrous cellulose dispersion fluid, the viscosity, the polymerization degree, the viscosity change rate, the fiber width, the fiber length, and the haze were measured by a method to be described later.

Example 36

A thixotropy-reduced microfibrous cellulose dispersion fluid was obtained in the same manner as in Example 6, except that the microfibrous cellulose dispersion fluid obtained in Production Example 14 was used. On the obtained thixotropy-reduced microfibrous cellulose dispersion fluid, the viscosity, the polymerization degree, the viscosity change rate, the fiber width, the fiber length, and the haze were measured by a method to be described later.

Example 37

A thixotropy-reduced microfibrous cellulose dispersion fluid was obtained in the same manner as in Example 8, except that the microfibrous cellulose dispersion fluid obtained in Production Example 14 was used. On the obtained thixotropy-reduced microfibrous cellulose dispersion fluid, the viscosity, the polymerization degree, the viscosity change rate, the fiber width, the fiber length, and the haze were measured by a method to be described later.

Example 38

A thixotropy-reduced microfibrous cellulose dispersion fluid was obtained in the same manner as in Example 10, except that the microfibrous cellulose dispersion fluid obtained in Production Example 14 was used. On the obtained thixotropy-reduced microfibrous cellulose dispersion fluid, the viscosity, the polymerization degree, the viscosity change rate, the fiber width, the fiber length, and the haze were measured by a method to be described later.

Example 39

A thixotropy-reduced microfibrous cellulose dispersion fluid was obtained in the same manner as in Example 4, except that the microfibrous cellulose dispersion fluid obtained in Production Example 15 was used. On the obtained thixotropy-reduced microfibrous cellulose dispersion fluid, the viscosity, the polymerization degree, the viscosity change rate, the fiber width, the fiber length, and the haze were measured by a method to be described later.

Example 40

A thixotropy-reduced microfibrous cellulose dispersion fluid was obtained in the same manner as in Example 6, except that the microfibrous cellulose dispersion fluid obtained in Production Example 15 was used. On the obtained thixotropy-reduced microfibrous cellulose dispersion fluid, the viscosity, the polymerization degree, the viscosity change rate, the fiber width, the fiber length, and the haze were measured by a method to be described later.

Example 41

A thixotropy-reduced microfibrous cellulose dispersion fluid was obtained in the same manner as in Example 8, except that the microfibrous cellulose dispersion fluid obtained in Production Example 15 was used. On the obtained thixotropy-reduced microfibrous cellulose dispersion fluid, the viscosity, the polymerization degree, the viscosity change rate, the fiber width, the fiber length, and the haze were measured by a method to be described later.

Example 42

A thixotropy-reduced microfibrous cellulose dispersion fluid was obtained in the same manner as in Example 10, except that the microfibrous cellulose dispersion fluid obtained in Production Example 15 was used. On the obtained thixotropy-reduced microfibrous cellulose dispersion fluid, the viscosity, the polymerization degree, the viscosity change rate, the fiber width, the fiber length, and the haze were measured by a method to be described later.

Example 43

A thixotropy-reduced microfibrous cellulose dispersion fluid was obtained in the same manner as in Example 1, except that the microfibrous cellulose dispersion fluid obtained in Production Example 16 was used, and an ozone/oxygen mixed gas with an ozone concentration of 40 $g/m^3$ was used. Here, the ozone addition rate was $2.0\times10^{-3}$ g relative to 1 g of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 44

A thixotropy-reduced microfibrous cellulose dispersion fluid was obtained in the same manner as in Example 1, except that the microfibrous cellulose dispersion fluid obtained in Production Example 17 was used, and an ozone/oxygen mixed gas with an ozone concentration of 40 $g/m^3$ was used. Here, the ozone addition rate was $2.0\times10^{-3}$ g relative to 1 g of the microfibrous cellulose. On the obtained thixotropy-reduced microfibrous cellulose dispersion fluid, the viscosity, the polymerization degree, the viscosity change rate, the fiber width, the fiber length, and the haze were measured by a method to be described later.

Example 45

A thixotropy-reduced microfibrous cellulose dispersion fluid was obtained in the same manner as in Example 4, except that the microfibrous cellulose dispersion fluid obtained in Production Example 13 was used. On the obtained thixotropy-reduced microfibrous cellulose dispersion fluid, the viscosity, the polymerization degree, the viscosity change rate, the fiber width, the fiber length, and the haze were measured by a method to be described later.

Comparative Example 1

2 L of an ozone/oxygen mixed gas having an ozone concentration of 200 $g/m^3$ was added to 500 g of the microfibrous cellulose dispersion fluid (solid content concentration 2% by mass, solid content 20 g) obtained in Production Example 1, and the mixture was stirred in a sealed container at 25° C. for 2 minutes and then allowed to stand still for 120 minutes. Here, the ozone addition rate was $4.0\times10^{-2}$ g relative to 1 g of the microfibrous cellulose. Then, the container was opened, and a stirring was performed for 5 hours to volatilize remaining ozone in the dispersion fluid. Then, a treatment with a high-pressure homogenizer was performed at a pressure of 200 MPa three times, to obtain a microfibrous cellulose dispersion fluid. In this manner, a thixotropy reduction of the microfibrous cellulose was performed, and on the obtained thixotropy-reduced microfibrous cellulose dispersion fluid, the viscosity, the polymerization degree, the viscosity change rate, the fiber width, the fiber length, and the haze were measured by a method to be described later.

Comparative Example 2

1 L of an ozone/oxygen mixed gas having an ozone concentration of 200 $g/m^3$ was added to 100 g of the phosphorylated pulp (solid content concentration 20% by mass, solid content 20 g) obtained in Production Example 5, and the mixture was stirred in a sealed container at 25° C. for 2 minutes and then allowed stand still for 30 minutes. Here, the ozone addition rate was $1.0\times10^{-2}$ g relative to 1 g of the microfibrous cellulose. Then, the phosphorylated pulp was washed to remove remaining ozone. Then, a slurry having a solid content concentration of 2% by mass was prepared by using the obtained pulp. This slurry was treated with a wet pulverizing device (STAR BURST, manufactured by Sugino Machine Limited) at a pressure of 200 MPa six times, so that a microfibrous cellulose dispersion fluid containing microfibrous cellulose was obtained. By using the obtained microfibrous cellulose dispersion fluid as it was, the viscosity, the polymerization degree, the viscosity change rate, the fiber width, the fiber length, and the haze were measured by a method to be described later.

Comparative Example 3

A thixotropy-reduced microfibrous cellulose dispersion fluid was obtained in the same manner as in Comparative Example 1, except that the microfibrous cellulose dispersion fluid obtained in Production Example 6 was used. On the obtained thixotropy-reduced microfibrous cellulose dispersion fluid, the viscosity, the polymerization degree, the viscosity change rate, the fiber width, the fiber length, and the haze were measured by a method to be described later.

Comparative Example 4

A thixotropy-reduced microfibrous cellulose dispersion fluid was obtained in the same manner as in Comparative Example 2, except that the phosphorylated pulp obtained in Production Example 8 was used. On the obtained thixotropy-reduced microfibrous cellulose dispersion fluid, the viscosity, the polymerization degree, the viscosity change rate, the fiber width, the fiber length, and the haze were measured by a method to be described later.

Comparative Example 5

By using the microfibrous cellulose dispersion fluid obtained in Production Example 1 as it was, the viscosity, the polymerization degree, the viscosity change rate, the fiber width, the fiber length, the haze were measured by a method to be described later.

Comparative Example 6

By using the microfibrous cellulose dispersion fluid obtained in Production Example 6 as it was, the viscosity, the polymerization degree, the viscosity change rate, the fiber width, the fiber length, the haze were measured by a method to be described later.

Comparative Example 7

By using the microfibrous cellulose dispersion fluid obtained in Production Example 9 as it was, the viscosity, the polymerization degree, the viscosity change rate, the fiber width, the fiber length, the haze were measured by a method to be described later.

Comparative Example 8

By using the microfibrous cellulose dispersion fluid obtained in Production Example 10 as it was, the viscosity, the polymerization degree, the viscosity change rate, the fiber width, the fiber length, the haze were measured by a method to be described later.

Comparative Example 9

A thixotropy-reduced microfibrous cellulose dispersion fluid was obtained in the same manner as in Example 4, except that the microfibrous cellulose dispersion fluid obtained in Production Example 5 was used. On the obtained thixotropy-reduced microfibrous cellulose dispersion fluid, the viscosity, the polymerization degree, the viscosity change rate, the fiber width, the fiber length, and the haze were measured by a method to be described later.

Comparative Example 10

A thixotropy-reduced microfibrous cellulose dispersion fluid was obtained in the same manner as in Example 6, except that the microfibrous cellulose dispersion fluid obtained in Production Example 5 was used. On the obtained thixotropy-reduced microfibrous cellulose dispersion fluid, the viscosity, the polymerization degree, the viscosity change rate, the fiber width, the fiber length, and the haze were measured by a method to be described later.

Comparative Example 11

A thixotropy-reduced microfibrous cellulose dispersion fluid was obtained in the same manner as in Example 3, except that the microfibrous cellulose dispersion fluid obtained in Production Example 18 was used. Since coarse fibers clearly remained in the obtained thixotropy-reduced microfibrous cellulose dispersion fluid, the haze (0.2% concentration haze value) or the dispersibility was poor. Thus, no measurement evaluation were performed on the viscosity of the dispersion fluid, the viscosity change rate, the coating suitability, the surface roughness of the coating film, and the aggregates of the coating film.

<Measurement>

[Measurement of Amount of Phosphorus Oxoacid Group]

The amount of phosphorus oxoacid group in microfibrous cellulose was measured by performing a treatment with an ion exchange resin on a fibrous cellulose-containing slurry prepared by diluting a microfibrous cellulose dispersion fluid containing target microfibrous cellulose with ion exchange water to set a content of 0.2% by mass, and then, performing a titration using alkali. The treatment with the ion exchange resin was performed by adding a strong acid ion exchange resin (Amberjet 1024; Organo Corporation, conditioned) with a volume of 1/10 to the fibrous cellulose-containing slurry, performing a shaking treatment for 1 hour, and then, separating the resin from the slurry through pouring on a mesh having a mesh size of 90 μm. In addition, the titration using alkali was performed by measuring the change in a pH value indicated by the slurry while adding 10 μL of a 0.1 N sodium hydroxide aqueous solution every 5 seconds to the fibrous cellulose-containing slurry that had been subjected to the treatment with the ion-exchanged resin. The titration was performed while blowing nitrogen gas to the slurry from 15 minutes before the start of titration. In this neutralization titration, on the curve plotting the measured pH relative to the addition amount of alkali, two points at which the increment (a differential value of pH relative to a dropping amount of alkali) is maximized are observed. Between these, a firstly obtained maximum point of the increment when alkali is added is called a first end point, and a secondly obtained maximum point of the increment is called a second end point (FIG. 1). The amount of required alkali from the start of titration to the first end point is equal to a first dissociated acid amount in the slurry used for the titration. In addition, the amount of required alkali from the start of titration to the second end point is equal to the total dissociated acid amount in the slurry used for the titration. A value obtained by dividing the amount (mmol) of required alkali from the start of titration to the first end point by the solid content (g) in the slurry as a titration target was set as an amount of the phosphoric acid group (mmol/g).

[Measurement of Amount of Sulfur Oxoacid Group]

The amount of sulfuric acid group was measured using a wet ashing of a sample and an ICP emission spectrometry. Specifically, the fibrous cellulose-containing slurry obtained in Production Example 7 was absolutely dried, weighed, added with perchloric acid to be carbonized, and further added with concentrated nitric acid to oxidize carbons into carbon dioxide, so that a sample solution containing only inorganic substance was obtained. The sample solution was diluted with an appropriate ratio, and the concentration of sulfate ions was measured through the ICP emission spectrometry. The amount of sulfur atoms contained in the sample solution was divided by the mass of the weighed fibrous cellulose, to obtain the amount of sulfuric acid group.

[Measurement of Amount of Carboxy Group]

The amount of carboxy group in microfibrous cellulose was measured by adding ion exchanged water to a microfibrous cellulose-containing slurry containing target microfibrous cellulose to set a content of 0.2% by mass, performing a treatment with an ion exchange resin, and then, performing a titration using alkali. The treatment with the ion exchanged resin was performed by adding a strong acid ion-exchanged resin (Amberjet 1024; manufactured by Organo Corporation, conditioned) with a volume of 1/10 to the microfibrous cellulose-containing slurry of 0.2% by mass, performing a shaking treatment for 1 hour, and then, separating the resin from the slurry through pouring on a mesh having a mesh size of 90 μm. In addition, the titration using alkali was performed by measuring the change in a pH value indicated by the slurry while adding 10 μL of a 0.1 N sodium hydroxide aqueous solution every 5 seconds to the fibrous cellulose-containing slurry that had been subjected to the treatment with the ion exchange resin. When the change in pH is observed while a sodium hydroxide aqueous solution is added, a titration curve illustrated in FIG. 2 is obtained. As illustrated in FIG. 2, in the neutralization titration, on the curve plotting the measured pH relative to the addition amount of alkali, one point at which the increment (a differential value of pH relative to a dropping amount of alkali) is maximized is observed. This increment maximum point is called a first end point. Here, a region from the start of titration to the first end point in FIG. 2 is called a first region. The amount of alkali required for the first region is equal to the amount of carboxy group in the slurry used for titration. Then, an introduction amount of the carboxy group (mmol/g) was calculated by dividing the amount of alkali (mmol) required for the first region on the titration curve by the solid content (g) in the microfibrous cellulose-containing slurry as a titration target. The above-described introduction amount of the carboxy group (mmol/g) indicates the amount of substituent (hereinafter, referred to as the amount of carboxy group (acid type)) per 1 g of the mass of the fibrous cellulose when the counterion of the carboxy group is a hydrogen ion ($H^+$).

[Measurement of Fiber Length and Fiber Width]

The fiber length of the microfibrous cellulose after the thixotropy reduction treatment was obtained by observing a sample, which was obtained by diluting the microfibrous cellulose dispersion fluid in 0.001% by mass, with an AFM, and performing an image analysis. Among Examples 1 to 45, the shortest fiber length was 250 nm, and the longest fiber length was 610 nm. Among Comparative Examples 1 to 11, the shortest fiber length was 230 nm, and the longest fiber length was 760 nm. Further, the fiber width of the microfibrous cellulose after the thixotropy reduction treatment was obtained using an electron microscope. In Examples 1 to 45 and Comparative Examples 1 to 10, the fiber width was 3 to 5 nm.

[Measurement of Viscosity of Microfibrous Cellulose Dispersion Fluid]

The viscosity of the microfibrous cellulose dispersion fluid obtained in the Examples and the Comparative Examples was measured as follows. First, the microfibrous cellulose dispersion fluid was diluted with ion exchanged water to have a solid content concentration of 0.4% by mass, and then, was stirred by a disperser at 1,500 rpm for 5 minutes. Then, the viscosity of the dispersion fluid obtained in this manner was measured by using a B-type viscometer (analog viscometer T-LVT, manufactured by BLOOKFIELD). Under a measurement condition of a rotation speed of 3 rpm, a viscosity value after 3 minutes from the the start of measurement was obtained as the viscosity of the corresponding dispersion fluid. In addition, the dispersion fluid to be measured was allowed to stand still for 24 hours under an environment of 23° C. and a relative humidity of 50% before the measurement. The fluid temperature of the dispersion fluid during the measurement was 23° C.

[Measurement 1 of Undiluted Solution Viscosity of Microfibrous Cellulose-Containing Dispersion Fluid ($\eta_ß$'1, $\eta_ß$'2)]

Without diluting the microfibrous cellulose-containing dispersion fluid, the measurement was performed by using a B-type viscometer (analog viscometer T-LVT, manufactured by BLOOKFIELD). Under measurement conditions of rotation speeds of 0.3 rpm and 3 rpm, a viscosity value after 3 minutes from the start of measurement was obtained as the viscosity of the corresponding dispersion fluid. Further, the dispersion fluid to be measured was allowed to stand still for 24 hours under an environment of 23° C. and a relative humidity of 50% before the measurement. The fluid temperature of the dispersion fluid during the measurement was 23° C.

The ratio between the viscosity ($\eta_ß$'1) at the rotation speed of 0.3 rpm and the viscosity ($\eta_ß$'2) at the rotation speed of 3 rpm (0.3 rpm/3 rpm, $\eta_ß$'1/$\eta_ß$'2) was calculated as a thixotropy index and represented in a table.

[Measurement 2 of Undiluted Solution Viscosity of Microfibrous Cellulose-Containing Dispersion Fluid ($\eta_ß$'1, $\eta_ß$'2)]

Without diluting the microfibrous cellulose-containing dispersion fluid, the measurement was performed by using a rheometer (RheoStress 1, manufactured by HAAK). Under the following measurement conditions, a viscosity value ($\eta_\alpha$'1) at a shear rate of 1 $sec^{-1}$ and a viscosity value ($\eta_\alpha$'2) at 1,000 $sec^{-1}$ were obtained as the viscosity of the corresponding dispersion fluid. Further, the dispersion fluid to be measured was allowed to stand still for 24 hours under an environment of 23° C. and a relative humidity of 50% before the measurement. The fluid temperature of the dispersion fluid during the measurement was 23° C.

Measuring tool: cone plate (diameter 35 mm, angle 2°)
Shear rate: 0.001 to 1,000 $sec^{-1}$
Number of data points: 31 points
Measurement time: 5 minutes Further, the ratio between the viscosity value ($\eta_\alpha$'1) at the shear rate of 1 $sec^{-1}$ and the viscosity ($\eta_\alpha$'2) at the shear rate of 1,000 $sec^{-1}$ (1 $sec^{-1}$/1,000 $sec^{-1}$, $\eta_\alpha$'1/$\eta_\alpha$'2) was calculated as a thixotropy index and represented in a table.

[Measurement of Specific Viscosity and Polymerization Degree of Microfibrous Cellulose]

The specific viscosity and the polymerization degree of the microfibrous cellulose obtained in the Examples and the Comparative Examples were measured according to Tappi T230. After a measurement was performed on a viscosity measured when cellulose fibers as a measurement target were dispersed in a dispersion medium (referred to as $\eta 1$), and a blank viscosity measured by only a dispersion medium (referred to as $\eta 0$), a specific viscosity ($\eta sp$) and an intrinsic viscosity ([$\eta$]) were measured according to the following formulae.

$$\eta sp=(\eta 1/\eta 0)-1$$

$$[\eta]=\eta sp/(c(1+0.28\times\eta sp))$$

Here, "c" in the formula indicates the concentration (g/mL) of the microfibrous cellulose at the time of the viscosity measurement. Further, the polymerization degree (DP) of the microfibrous cellulose was calculated from the following formula.

$$DP=1.75\times[\eta]$$

This polymerization degree is an average polymerization degree measured according to a viscosity method, and thus, may be referred to as a "viscosity average polymerization degree".

[Measurement of Viscosity Change Rate of Microfibrous Cellulose Dispersion Fluid]

The viscosity change rate of the microfibrous cellulose dispersion fluid was measured as follows.

(Measurement of Viscosity Before Stirring)

First, water and isopropanol were added in this order to the microfibrous cellulose dispersion fluid obtained in the Examples and the Comparative Examples, such that the viscosity measured by a method to be described later became about 2,500 mPa·s, and the mass ratio of the water and the isopropanol contained in the dispersion fluid became 7:3. The dispersion fluid obtained in this manner was poured into a cylindrical container with a diameter of 10 cm to a height of 5 cm, and was stirred by a disperser at 1,500 rpm for 5 minutes. After 1 minute from the end of stirring, the viscosity of the obtained microfibrous cellulose dispersion fluid was measured by using a B-type viscometer (analog viscometer T-LVT, manufactured by BLOOKFIELD). Under a measurement condition of a rotation speed of 6 rpm, a viscosity value after 1 minute after the start of measurement was obtained as the viscosity of the corresponding dispersion fluid. The fluid temperature of the dispersion fluid during the measurement was 23° C.

(Stirring by Stirrer)

Next, the obtained microfibrous cellulose dispersion fluid (microfibrous cellulose dispersion fluid having a viscosity of about 2,500 mPa·s) was poured into a cylindrical container having a diameter of 10 cm to a height of 5 cm, and was stirred for 24 hours by using an elliptical stirrer having a length of 5 cm, a center width of 2 cm, and an end width of 1 cm while maintaining a 2 cm-recessed state at the center of a fluid surface. The fluid temperature of the dispersion fluid during the stirring was 23° C.

(Measurement of Viscosity after Stirring)

After 1 minute from the end of stirring by the stirrer, the viscosity of the microfibrous cellulose dispersion fluid was immediately measured by using a B-type viscometer (analog viscometer T-LVT, manufactured by BLOOKFIELD). Under a measurement condition of a rotation speed of 6 rpm, a viscosity value after 1 minute from the start of measurement was obtained as the viscosity of the corresponding dispersion fluid. In addition, the fluid temperature of the dispersion fluid during the measurement was 23° C.

(Calculation of Viscosity Change Rate)

A viscosity change rate before/after the stirring by a stirrer was calculated from the following formula.

$$\text{Viscosity change rate (\%)}=(\text{viscosity after stirring}-\text{viscosity before stirring})/\text{viscosity before stirring}\times 100$$

[Measurement of Haze of Microfibrous Cellulose Dispersion Fluid]

The haze of the microfibrous cellulose dispersion fluid was measured as follows. After diluting the microfibrous cellulose dispersion fluid obtained in the Examples and the Comparative Examples with ion exchange water to have the solid content concentration of 0.2% by mass, a defoaming treatment was performed in a rotation-revolution type super mixer (ARE-250, manufactured by Thinky Co., Ltd.). Then, the haze of the obtained dispersion fluid was measured with a hazemeter (HM-150, manufactured by Murakami Color Research Laboratory, Co., Ltd.) by using a glass cell for a liquid with an optical path length of 1 cm (MG-40, manufactured by Fujiwara Scientific Co., Ltd., inverse optical path) in accordance with JIS K 7136:2000. A zero point measurement was performed with ion exchange water put in the same glass cell.

[Evaluation of Appearance of Microfibrous Cellulose Dispersion Fluid]

A defoaming treatment was performed on the microfibrous cellulose dispersion fluid obtained in the Examples and the Comparative Examples, using an automatic-revolution type super mixer (ARE-250, manufactured by Thinky Co., Ltd.). Then, the appearance was visually evaluated according to the following criteria.

A: Almost no fibers are visually observed, and the dispersion fluid is transparent.

B: Almost no fibers are visually observed, and the dispersion fluid is translucent.

C: Fibers are not uniformly distributed, and the dispersion fluid is cloudy, or particles (aggregates of fibers) are observed.

[Evaluation of Defoaming Performance of Microfibrous Cellulose]

After diluting the microfibrous cellulose dispersion fluid obtained in the Examples and the Comparative Examples with ion exchange water to have the solid content concentration of 1% by mass, a stirring was performed in a disperser at 4,000 rpm for 3 minutes, and a defoaming treatment was performed in a rotation-revolution type super mixer (ARE-250, manufactured by Thinky Co., Ltd.). The defoaming performance was evaluated based on a time required to complete the defoaming treatment, according to the following evaluation criteria.

A: The defoaming treatment was completed within 2 minutes.

B: The defoaming treatment was completed in more than 2 minutes but no more than 4 minutes.

C: The defoaming treatment was completed in more than 4 minutes but no more than 8 minutes.

D: It took more than 8 minutes to complete the defoaming treatment.

[Evaluation of Particle Dispersibility of Microfibrous Cellulose Dispersion Fluid]

After diluting the microfibrous cellulose dispersion fluid obtained in the Examples and the Comparative Examples with ion exchange water to have the solid content concentration of 1% by mass, a stirring was performed in a disperser at 4,000 rpm for 3 minutes, and a defoaming treatment was performed in a rotation-revolution type super mixer (ARE-250, manufactured by Thinky Co., Ltd.). Glass beads (diameter 3 mm, specific gravity 2.5 g/$cm^3$, material: soda glass) were added to observe a sedimentation of the beads, and the particle dispersibility was evaluated according to the following evaluation criteria.

A: Beads are uniformly dispersed for 24 hours or longer.

B: Beads are uniformly dispersed for 5 hours or more and less than 24 hours.

C: Beads are uniformly dispersed for 10 minutes or more and less than 5 hours.

D: The sedimentation of beads is observed in less than 10 minutes.

[Evaluation of Coating Suitability of Paint]

The coating suitability of paint using the microfibrous cellulose dispersion fluid obtained in the Examples and the Comparative Examples was evaluated in the following manner.

(Preparation of Microfibrous Cellulose-Containing Paint)

1 part by mass of a luster material (aluminum paste WXM7640, manufactured by Toyo Aluminium, Co., Ltd., aluminum concentration: 58 to 61% by mass) was added to 100 parts by mass of the microfibrous cellulose dispersion fluid, with a viscosity of about 2,500 mPa·s, obtained by the same method as described above, and then, a stirring was performed in a disperser at 1,500 rpm for 5 minutes, so that microfibrous cellulose-containing paint was obtained.

(Circulation and Spray Coating of Paint)

Next, the obtained microfibrous cellulose-containing paint was caused to circulate through the inside of a pipe by a pump-type circulation device for 24 hours. Immediately after the end of the circulation, the ultrafine cellulose-containing paint was coated on a wall surface with a spray gun, to observe the presence/absence of liquid sagging. Further, the presence/absence of sedimentation of the luster material in the ultrafine cellulose-containing paint was visually observed at the time of the coating. From the results of the liquid sagging of the paint and the sedimentation of the luster material, the coating suitability of the microfibrous cellulose-containing paint was evaluated in four levels.

A: During coating after the paint is circulated, liquid sagging and luster material sedimentation are not observed, and thus the coating suitability is very good.

B: During coating after the paint is circulated, either liquid sagging or bright material sedimentation is observed, but is slight, and thus the coating suitability is good.

C: During coating after the paint is circulated, liquid sagging and luster material sedimentation are observed, and thus the coating suitability is slightly poor, but there is no problem in practical use.

D: During coating after the paint is circulated, liquid sagging and luster material sedimentation are significantly observed, and thus the coating suitability is poor, and there is a problem in practical use.

[Evaluation of Coating Film Appearance]

The coating film appearance of the paint using the microfibrous cellulose dispersion fluid obtained by the present embodiment was evaluated as follows.

(Preparation of Microfibrous Cellulose-Containing Paint)

24.9 g of a microfibrous cellulose dispersion fluid having a solid content concentration of 0.4% by mass was put in a beaker, and 34.4 g of ion exchange water, 35.2 g of an acrylic resin, and 5.49 g of a curing agent were added thereto in this order. This addition was performed while performing a stirring with the T.K. homodisper (manufactured by Tokushu Kika Kogyo Co., Ltd.) at 1,500 rpm, and after all of the additives were added, the stirring was further performed for 5 minutes, and then, a defoaming treatment was performed in a defoaming device (rotation-revolution mixer AR-250, manufactured by Thinky Co., Ltd.). In this way, a microfibrous cellulose-containing paint with a solid content ratio of the acrylic resin of 78, the curing agent of 22, and the microfibrous cellulose of 0.5 (mass ratio) was obtained.

(Preparation of Coating Film for Evaluation)

By using the obtained paint, a coating was performed on a PET (polyethylene terephthalate) film (product name: Lumirror T60, thickness 75 μm, manufactured by Toray Industries, Inc.) as a base material, with an applicator, such that the coating film thickness after a drying became 30 μm. Immediately after the coating, a heating was performed with a dryer of a temperature of 80° C. for 30 minutes, so that a cured coating film with the PET film as a base material was obtained.

(Surface Roughness of Coating Film)

The surface roughness of the obtained cured coating film was measured. Specifically, an arithmetic average roughness (Ra (μm)) of the cured coating film was measured over a measurement range of 470.92 μm×353.16 μm, by using an optical interference non-contact surface profile measuring device (non-contact surface layer cross-section profile measurement system VertScan 2.0, Model: R5500GML, manufactured by Ryoka Systems Inc.) with a ×10 object lens. The measurement was performed 5 times per level, and an arithmetic average roughness was obtained from an average value of the measurement values. Details such as the definition of the arithmetic average roughness (Ra), measurement conditions, and a calculation method conformed to JIS B 0601:2013.

(Number of Aggregates)

The coated product with the PET film as a base material was observed by using an optical microscope (manufactured by Nikon Corporation), and N (number/$mm^2$) which is the number of aggregates having a size of 5 μm or more in 1 $mm^2$ was observed at 100 locations, and an arithmetic average value thereof (N/100) was calculated. The result was evaluated as follows.

A: The arithmetic average value of aggregates in a size of 5 μm or more is less than 3/$mm^2$.

B: The arithmetic average value of aggregates in a size of 5 μm or more is 3/$mm^2$ or more and less than 8.

C: The arithmetic average value of aggregates in a size of 5 μm or more is 8/$mm^2$ or more and less than 13/$mm^2$.

D: The arithmetic average value of aggregates in a size of 5 μm or more is 13/$mm^2$ or more.

The size of aggregates was a diameter equivalent to a circle, and details such as measurement conditions and a calculation method conformed to JIS Z 8827-1:2008.

TABLE 1

| | | Example 1 | Example 2 | Example 3 | Example 4 | Example 5 |
|---|---|---|---|---|---|---|
| Substituent | | Phosphoric acid group | Phosphoric acid group | Phosphoric acid group | Phosphoric acid group | Phosphoric acid group |
| Amount of substituent [mmol/g] | | 0.80 | 0.80 | 0.80 | 0.80 | 0.80 |
| Thixotropy reduction treatment | | Ozone ($2.0 \times 10^{-2}$ g) | Ozone ($2.0 \times 10^{-2}$ g) | Ozone ($1.0 \times 10^{-2}$ g) | Ozone ($2.0 \times 10^{-3}$ g) | Enzyme ($5.0 \times 10^{-5}$ g) |
| 0.4% by mass viscosity [mPa · s] | | 40 | 80 | 430 | 2,300 | 480 |
| Polymerization degree | | 172 | 246 | 416 | 480 | 433 |
| Dispersion fluid concentration [mass %] | | 2.0 | 2.0 | 2.0 | 2.0 | 2.0 |
| Undiluted solution viscosity (B-type) | 0.3 rpm [mPa · s] | 355,000 | 448,000 | 785,000 | 1,375,000 | 815,000 |
| | 3 rpm [mPa · s] | 48,700 | 62,100 | 112,400 | 202,900 | 116,800 |
| | 0.3 rpm/3 rpm | 7.29 | 7.21 | 6.98 | 6.78 | 6.98 |
| Undiluted solution viscosity (rheometer) | 1 $sec^{-1}$ [Pa · s] | 32 | 38 | 59 | 91 | 60 |
| | 1,000 $sec^{-1}$ [Pa · s] | 0.065 | 0.078 | 0.120 | 0.184 | 0.123 |
| | 1 $sec^{-1}$/1,000 $sec^{-1}$ | 492 | 487 | 492 | 495 | 488 |
| Viscosity change rate | Solid content concentration [mass %] | 2.00 | 1.00 | 0.75 | 0.60 | 0.75 |
| | Viscosity before stirring [mPa · s] | 2,240 | 2,180 | 2,420 | 2,700 | 2,500 |
| | Viscosity after stirring [mPa · s] | 1,360 | 1,670 | 2,400 | 2,060 | 2,450 |
| | Viscosity change rate [%] | −39.3 | −23.4 | −0.8 | −23.7 | −2.0 |
| 0.2% concentration haze [%] | | 0.7 | 5.6 | 6.2 | 7.4 | 6.3 |
| Appearance evaluation of dispersion fluid | | A | A | A | A | A |
| Defoaming performance | | A | A | B | B | B |
| Particle dispersibility | | D | D | C | A | C |
| Coating suitability of paint | | C | C | A | B | A |
| Surface roughness of coating film [μm] | | 0.11 | 0.12 | 0.15 | 0.15 | 0.16 |
| Aggregates of coating film | | A | A | A | A | A |

TABLE 1-continued

| | | Example 6 | Example 7 | Example 8 | Example 9 | Example 10 |
|---|---|---|---|---|---|---|
| Substituent | | Phosphoric acid group | Phosphoric acid group | Phosphoric acid group | Phosphoric acid group | Phosphoric acid group |
| Amount of substituent [mmol/g] | | 0.80 | 0.80 | 0.80 | 0.80 | 0.80 |
| Thixotropy reduction treatment | | Enzyme ($1.0 \times 10^{-5}$ g) | Sodium hypochlorite (1.02 g) | Sodium hypochlorite ($1.02 \times 10^{-2}$ g) | Sub-critical water (heating time 10 sec) | Sub-critical water (heating time 1 sec) |
| 0.4% by mass viscosity [mPa · s] | | 2,190 | 580 | 2,390 | 410 | 2,070 |
| Polymerization degree | | 477 | 442 | 482 | 412 | 466 |
| Dispersion fluid concentration [mass %] | | 2.0 | 2.0 | 2.0 | 2.0 | 2.0 |
| Undiluted solution viscosity (B-type) | 0.3 rpm [mPa · s] | 1,353,000 | 868,000 | 1,393,000 | 773,000 | 1,328,000 |
| | 3 rpm [mPa · s] | 199,500 | 124,900 | 205,700 | 110,500 | 195,500 |
| | 0.3 rpm/3 rpm | 6.78 | 6.95 | 6.77 | 7.00 | 6.79 |
| Undiluted solution viscosity (rheometer) | 1 $sec^{-1}$ [Pa · s] | 89 | 63 | 92 | 58 | 88 |
| | 1,000 $sec^{-1}$ [Pa · s] | 0.181 | 0.129 | 0.186 | 0.118 | 0.179 |
| | 1 $sec^{-1}$/1,000 $sec^{-1}$ | 492 | 488 | 495 | 492 | 492 |
| Viscosity change rate | Solid content concentration [mass %] | 0.60 | 0.75 | 0.60 | 0.75 | 0.60 |
| | Viscosity before stirring [mPa · s] | 2,430 | 2,580 | 2,630 | 2,520 | 2,500 |
| | Viscosity after stirring [mPa · s] | 1,840 | 2,500 | 1,860 | 2,450 | 1,850 |
| | Viscosity change rate [%] | −24.3 | −3.1 | −29.3 | −2.8 | −26.0 |
| 0.2% concentration haze [%] | | 7.5 | 6.4 | 7.8 | 6.4 | 7.9 |
| Appearance evaluation of dispersion fluid | | A | A | A | A | A |
| Defoaming performance | | B | B | B | B | B |
| Particle dispersibility | | A | C | A | C | A |
| Coating suitability of paint | | B | A | B | A | B |
| Surface roughness of coating film [μm] | | 0.19 | 0.16 | 0.18 | 0.16 | 0.18 |
| Aggreμgates of coating film | | A | A | A | A | A |

TABLE 2

| | | Example 11 | Example 12 | Example 13 | Example 14 | Example 15 |
|---|---|---|---|---|---|---|
| Substituent | | Phosphorous acid group | Phosphorous acid group | Phosphorous acid group | Phosphorous acid group | Phosphorous acid group |
| Amount of substituent [mmol/g] | | 0.74 | 0.74 | 0.74 | 0.74 | 0.74 |
| Thixotropy reduction treatment | | Ozone ($2.0 \times 10^{-2}$ g) | Ozone ($2.0 \times 10^{-2}$ g) | Ozone ($1.0 \times 10^{-2}$ g) | Ozone ($2.0 \times 10^{-3}$ g) | Enzyme ($5.0 \times 10^{-5}$ g) |
| 0.4% by mass viscosity [mPa · s] | | 40 | 90 | 440 | 2,200 | 490 |
| Polymerization degree | | 175 | 252 | 422 | 476 | 443 |
| Dispersion fluid concentration [mass %] | | 2.0 | 2.0 | 2.0 | 2.0 | 2.0 |
| Undiluted solution viscosity (B-type) | 0.3 rpm [mPa · s] | 355,000 | 466,000 | 791,000 | 1,355,000 | 820,000 |
| | 3 rpm [mPa · s] | 48,700 | 64,800 | 113,300 | 199,800 | 117,700 |
| | 0.3 rpm/3 rpm | 7.29 | 7.19 | 6.98 | 6.78 | 6.97 |
| Undiluted solution viscosity (rheometer) | 1 $sec^{-1}$ [Pa · s] | 31 | 39 | 59 | 90 | 61 |
| | 1,000 $sec^{-1}$ [Pa · s] | 0.065 | 0.080 | 0.121 | 0.182 | 0.124 |
| | 1 $sec^{-1}$/1,000 $sec^{-1}$ | 477 | 488 | 488 | 495 | 492 |
| Viscosity change rate | Solid content concentration [mass %] | 2.00 | 1.00 | 0.75 | 0.60 | 0.75 |
| | Viscosity before stirring [mPa · s] | 2,300 | 2,130 | 2,330 | 2,580 | 2,640 |
| | Viscosity after stirring [mPa · s] | 1,380 | 1,570 | 2,300 | 2,080 | 2,570 |
| | Viscosity change rate [%] | −40.0 | −26.3 | −1.3 | −19.4 | −2.7 |
| 0.2% concentration haze [%] | | 0.8 | 5.5 | 6.5 | 7.9 | 6.7 |
| Appearance evaluation of dispersion fluid | | A | A | A | A | A |
| Defoaming performance | | A | A | B | B | B |
| Particle dispersibility | | D | D | C | A | C |
| Coating suitability of paint | | C | C | A | B | A |
| Surface roughness of coating film [μm] | | 0.11 | 0.13 | 0.17 | 0.16 | 0.17 |
| Aggregates of coating film | | A | A | A | A | A |

| | | Example 16 | Example 17 | Example 18 | Example 19 | Example 20 |
|---|---|---|---|---|---|---|
| Substituent | | Phosphorous acid group | Phosphorous acid group | Phosphorous acid group | Phosphorous acid group | Phosphorous acid group |
| Amount of substituent [mmol/g] | | 0.74 | 0.74 | 0.74 | 0.74 | 0.74 |
| Thixotropy reduction treatment | | Enzyme ($1.0 \times 10^{-5}$ g) | Sodium hypochlorite (1.02 g) | Sodium hypochlorite ($1.02 \times 10^{-2}$ g) | Sub-critical water (heating time 10 sec) | Sub-critical water (heating time 1 sec) |
| 0.4% by mass viscosity [mPa · s] | | 2,170 | 560 | 2,350 | 420 | 1,940 |
| Polymerization degree | | 482 | 433 | 479 | 410 | 460 |

TABLE 2-continued

| | | | | | | |
|---|---|---|---|---|---|---|
| Dispersion fluid concentration [mass %] | | 2.0 | 2.0 | 2.0 | 2.0 | 2.0 |
| Undiluted | 0.3 rpm [mPa · s] | 1,349,000 | 858,000 | 1,385,000 | 779,000 | 1,299,000 |
| solution viscosity | 3 rpm [mPa · s] | 198,800 | 123,400 | 204,500 | 111,500 | 191,100 |
| (B-type) | 0.3 rpm/3 rpm | 6.79 | 6.95 | 6.77 | 6.99 | 6.80 |
| Undiluted | 1 $sec^{-1}$ [Pa · s] | 89 | 63 | 91 | 58 | 87 |
| solution viscosity | 1,000 $sec^{-1}$ [Pa · s] | 0.181 | 0.128 | 0.185 | 0.119 | 0.176 |
| (rheometer) | 1 $sec^{-1}$/1,000 $sec^{-1}$ | 492 | 492 | 492 | 487 | 494 |
| Viscosity change rate | Solid content concentration [mass %] | 0.60 | 0.75 | 0.60 | 0.75 | 0.60 |
| | Viscosity before stirring [mPa · s] | 2,490 | 2,630 | 2,670 | 2,480 | 2,660 |
| | Viscosity after stirring [mPa · s] | 1,850 | 2,550 | 1,890 | 2,400 | 1,960 |
| | Viscosity change rate [%] | −25.7 | −3.0 | −29.2 | −3.2 | −26.3 |
| 0.2% concentration haze [%] | | 7.5 | 6.4 | 7.8 | 6.2 | 7.2 |
| Appearance evaluation of dispersion fluid | | A | A | A | A | A |
| Defoaming performance | | B | B | B | B | B |
| Particle dispersibility | | A | C | A | C | A |
| Coating suitability of paint | | B | A | B | A | B |
| Surface roughness of coating film [μm] | | 0.15 | 0.15 | 0.16 | 0.17 | 0.18 |
| Aggregates of coating film | | A | A | A | A | A |

TABLE 3

| | | Example 21 | Example 22 | Example 23 | Example 24 | Example 25 | Example 26 |
|---|---|---|---|---|---|---|---|
| Substituent | | Phosphoric acid group | Phosphoric acid group | Phosphoric acid group | Phosphorous acid group | Sulfuric acid group | Carboxy group |
| Amount of substituent [mmol/g] | | 1.00 | 1.20 | 1.45 | 1.41 | 0.88 | 0.70 |
| Thixotropy reduction treatment | | Ozone ($1.0 \times 10^{-2}$ g) | Ozone ($1.0 \times 10^{-2}$ g) | Ozone ($1.0 \times 10^{-2}$ g) | Ozone ($1.0 \times 10^{-3}$ g) | Ozone ($1.0 \times 10^{-5}$ g) | Ozone ($1.0 \times 10^{-5}$ g) |
| 0.4% by mass viscosity [mPa · s] | | 340 | 380 | 280 | 270 | 490 | 690 |
| Polymerization degree | | 378 | 356 | 310 | 320 | 430 | 439 |
| Dispersion fluid concentration [mass %] | | 2.0 | 2.0 | 2.0 | 2.0 | 2.0 | 2.0 |
| Undiluted | 0.3 rpm [mPa · s] | 726,000 | 607,000 | 554,000 | 548,000 | 820,000 | 920,000 |
| solution | 3 rpm [mPa · s] | 103,500 | 90,100 | 82,600 | 81,700 | 117,700 | 132,800 |
| viscosity (B-type) | 0.3 rpm/3 rpm | 7.01 | 6.74 | 6.71 | 6.71 | 6.97 | 6.93 |
| Undiluted | 1 $sec^{-1}$ [Pa · s] | 55 | 56 | 51 | 51 | 61 | 66 |
| solution | 1,000 $sec^{-1}$ [Pa · s] | 0.113 | 0.072 | 0.062 | 0.063 | 0.124 | 0.135 |
| viscosity (rheometer) | 1 $sec^{-1}$/1,000 $sec^{-1}$ | 487 | 778 | 823 | 810 | 492 | 489 |
| Viscosity change rate | Solid content concentration [mass %] | 0.75 | 0.75 | 0.75 | 0.75 | 0.75 | 0.75 |
| | Viscosity before stirring [mPa · s] | 2,280 | 2,130 | 2,160 | 2,190 | 2,390 | 2,860 |
| | Viscosity after stirring [mPa · s] | 2,250 | 1,850 | 1,600 | 1,620 | 2,340 | 2,300 |
| | Viscosity change rate [%] | −1.3 | −13.1 | −25.9 | −26.0 | −2.1 | −19.6 |
| 0.2% concentration haze [%] | | 3.0 | 1.3 | 0.8 | 1.0 | 6.0 | 14.4 |
| Appearance evaluation of dispersion fluid | | A | A | A | A | A | A |
| Defoaming performance | | B | B | B | B | B | B |
| Particle dispersibility | | C | C | C | C | C | C |
| Coating suitability of paint | | A | A | A | A | A | B |
| Surface roughness of coating film [μm] | | 0.17 | 0.23 | 0.28 | 0.28 | 0.15 | 0.18 |
| Aggregates of coating film | | A | B | C | C | A | A |

TABLE 4

| | Example 27 | Example 28 | Example 29 | Example 30 |
|---|---|---|---|---|
| Substituent | Phosphoric acid group | Phosphoric acid group | Phosphoric acid group | Phosphoric acid group |
| Amount of substituent [mmol/g] | 0.74 | 0.74 | 0.74 | 0.74 |
| Thixotropy reduction treatment | Ozone ($2.0 \times 10^{-3}$ g) | Enzyme ($1.0 \times 10^{-5}$ g) | Sodium hypochlorite | Sub-critical water |

TABLE 4-continued

| | | | | (1.02 × $10^{-2}$ g) | (heating time 1 sec) |
|---|---|---|---|---|---|
| 0.4% by mass viscosity [mPa · s] | | 3,790 | 2,980 | 3,620 | 3,440 |
| Polymerization degree | | 513 | 500 | 510 | 507 |
| Dispersion fluid concentration [mass %] | | 2.0 | 2.0 | 2.0 | 2.0 |
| Undiluted solution viscosity (B-type) | 0.3 rpm [mPa · s] | 1,625,000 | 1,500,000 | 1,600,000 | 1,573,000 |
| | 3 rpm [mPa · s] | 242,000 | 222,300 | 238,100 | 233,900 |
| | 0.3 rpm/3 rpm | 6.71 | 6.75 | 6.72 | 6.73 |
| Undiluted solution viscosity (rheometer) | 1 $sec^{-1}$ [Pa · s] | 103 | 97 | 102 | 101 |
| | 1,000 $sec^{-1}$ [Pa · s] | 0.209 | 0.196 | 0.206 | 0.204 |
| | 1 $sec^{-1}$/1,000 $sec^{-1}$ | 493 | 495 | 495 | 495 |
| Viscosity change rate | Solid content concentration [mass %] | 0.50 | 0.50 | 0.50 | 0.50 |
| | Viscosity before stirring [mPa · s] | 2,860 | 2,260 | 2,730 | 2,600 |
| | Viscosity after stirring [mPa · s] | 2,370 | 1,920 | 2,270 | 2,140 |
| | Viscosity change rate [%] | −17.1 | −15.0 | −16.8 | −17.7 |
| 0.2% concentration haze [%] | | 9.4 | 9.0 | 9.5 | 9.6 |
| Appearance evaluation of dispersion fluid | | B | B | B | B |
| Defoaming performance | | B | B | B | B |
| Particle dispersibility | | A | A | A | A |
| Coating suitability of paint | | B | B | B | B |
| Surface roughness of coating film [μm] | | 0.15 | 0.18 | 0.18 | 0.19 |
| Aggregates of coating film | | A | A | A | A |

| | | Example 31 | Example 32 | Example 33 | Example 34 |
|---|---|---|---|---|---|
| Substituent | | Phosphoric acid group | Phosphoric acid group | Phosphoric acid group | Phosphoric acid group |
| Amount of substituent [mmol/g] | | 0.74 | 0.74 | 0.74 | 0.74 |
| Thixotropy reduction treatment | | Ozone (2.0 × $10^{-3}$ g) | Enzyme (1.0 × $10^{-5}$ g) | Sodium hypochlorite (1.02 × $10^{-2}$ g) | Sub-critical water (heating time 1 sec) |
| 0.4% by mass viscosity [mPa · s] | | 1,100 | 980 | 750 | 820 |
| Polymerization degree | | 450 | 449 | 442 | 445 |
| Dispersion fluid concentration [mass %] | | 2.0 | 2.0 | 2.0 | 2.0 |
| Undiluted solution viscosity (B-type) | 0.3 rpm [mPa · s] | 1,075,000 | 1,034,000 | 946,000 | 974,000 |
| | 3 rpm [mPa · s] | 156,500 | 150,200 | 136,700 | 141,100 |
| | 0.3 rpm/3 rpm | 6.87 | 6.88 | 6.92 | 6.90 |
| Undiluted solution viscosity (rheometer) | 1 $sec^{-1}$ [Pa · s] | 75 | 73 | 68 | 69 |
| | 1,000 $sec^{-1}$ [Pa · s] | 0.152 | 0.148 | 0.138 | 0.141 |
| | 1 $sec^{-1}$/1,000 $sec^{-1}$ | 493 | 493 | 493 | 489 |
| Viscosity change rate | Solid content concentration [mass %] | 0.70 | 0.70 | 0.70 | 0.70 |
| | Viscosity before stirring [mPa · s] | 2,630 | 2,700 | 2,580 | 2,490 |
| | Viscosity after stirring [mPa · s] | 1,950 | 2,030 | 1,980 | 2,000 |
| | Viscosity change rate [%] | −25.9 | −24.8 | −23.3 | −24.5 |
| 0.2% concentration haze [%] | | 4.9 | 5.4 | 5.3 | 5.2 |
| Appearance evaluation of dispersion fluid | | A | A | A | A |
| Defoaming performance | | B | B | B | B |
| Particle dispersibility | | B | B | B | B |
| Coating suitability of paint | | B | B | B | B |
| Surface roughness of coating film [μm] | | 0.19 | 0.15 | 0.17 | 0.17 |
| Aggregates of coating film | | A | A | A | A |

TABLE 5

| | | Example 35 | Example 36 | Example 37 | Example 38 | Example 39 | Example 40 |
|---|---|---|---|---|---|---|---|
| Substituent | | Phosphoric acid group | Phosphoric acid group | Phosphoric acid group | Phosphoric acid group | Phosphoric acid group | Phosphoric acid group |
| Amount of substituent [mmol/g] | | 0.80 | 0.80 | 0.80 | 0.80 | 0.80 | 0.80 |
| Thixotropy reduction treatment | | Ozone ($2.0 \times 10^{-3}$ g) | Enzyme ($1.0 \times 10^{-5}$ g) | Sodium hypochlorite ($1.02 \times 10^{-2}$ g) | Sub-critical water (heating time 1 sec) | ($2.0 \times 10^{-3}$ g) Ozone | Enzyme ($1.0 \times 10^{-5}$ g) |
| 0.4% by mass viscosity [mPa · s] | | 2,470 | 2,150 | 2,240 | 2,340 | 2,850 | 2,310 |
| Polymerization degree | | 485 | 474 | 479 | 481 | 498 | 481 |
| Dispersion fluid concentration [mass %] | | 2.4 | 2.4 | 2.4 | 2.4 | 2.9 | 2.9 |
| Undiluted solution viscosity (B-type) | 0.3 rpm [mPa · s] | 1,953,000 | 1,889,000 | 1,908,000 | 1,928,000 | 2,703,000 | 2,603,000 |
| | 3 rpm [mPa · s] | 284,300 | 274,400 | 277,200 | 280,400 | 390,300 | 374,700 |
| | 0.3 rpm/3 rpm | 6.87 | 6.88 | 6.88 | 6.88 | 6.93 | 6.95 |
| Undiluted solution viscosity (rheometer) | 1 $sec^{-1}$ [Pa · s] | 122 | 119 | 120 | 121 | 163 | 158 |
| | 1,000 $sec^{-1}$ [Pa · s] | 0.254 | 0.247 | 0.249 | 0.251 | 0.344 | 0.334 |
| | 1 $sec^{-1}$/1,000 $sec^{-1}$ | 480 | 482 | 482 | 482 | 474 | 473 |
| Viscosity change rate | Solid content concentration [mass %] | 0.60 | 0.60 | 0.60 | 0.60 | 0.60 | 0.60 |
| | Viscosity before stirring [mPa · s] | 2,600 | 2,450 | 2,560 | 2,580 | 2,790 | 2,530 |
| | Viscosity after stirring [mPa · s] | 1,990 | 1,870 | 2,060 | 1,970 | 2,150 | 2,010 |
| | Viscosity change rate [%] | −23.5 | −23.7 | −19.5 | −23.6 | −22.9 | −20.6 |
| 0.2% concentration haze [%] | | 9.3 | 9.4 | 9.2 | 9.5 | 12.7 | 12.5 |
| Appearance evaluation of dispersion fluid | | A | A | A | A | B | B |
| Defoaming performance | | B | B | B | B | B | B |
| Particle dispersibility | | A | A | A | A | A | A |
| Coating suitability of paint | | B | B | B | B | B | B |
| Surface roughness of coating film [μm] | | 0.14 | 0.17 | 0.14 | 0.16 | 0.19 | 0.18 |
| Aggregates of coating film | | A | A | A | A | A | A |

| | | Example 41 | Example 42 | Example 43 | Example 44 | Example 45 |
|---|---|---|---|---|---|---|
| Substituent | | Phosphoric acid group | Phosphoric acid group | Phosphoric acid group | Phosphoric acid group | Sulfuric acid group |
| Amount of substituent [mmol/g] | | 0.80 | 0.80 | 0.80 | 0.80 | 0.94 |
| Thixotropy reduction treatment | | Sodium hypochlorite ($1.02 \times 10^{-2}$ g) | Sub-critical water (heating time 1 sec) | Ozone ($2.0 \times 10^{-3}$ g) | Ozone ($2.0 \times 10^{-3}$ g) | Ozone ($2.0 \times 10^{-3}$ g) |
| 0.4% by mass viscosity [mPa · s] | | 2,500 | 2,700 | 410 | 420 | 860 |
| Polymerization degree | | 485 | 493 | 419 | 422 | 445 |
| Dispersion fluid concentration [mass %] | | 2.9 | 2.9 | 4.0 | 4.9 | 2.0 |
| Undiluted solution viscosity (B-type) | 0.3 rpm [mPa · s] | 2,640,000 | 2,677,000 | 3,497,000 | 4,729,000 | 1,433,000 |
| | 3 rpm [mPa · s] | 380,400 | 386,200 | 491,500 | 663,800 | 211,900 |
| | 0.3 rpm/3 rpm | 6.94 | 6.93 | 7.11 | 7.12 | 6.76 |
| Undiluted solution viscosity (rheometer) | 1 $sec^{-1}$ [Pa · s] | 160 | 162 | 208 | 276 | 94 |
| | 1,000 $sec^{-1}$ [Pa · s] | 0.338 | 0.341 | 0.452 | 0.603 | 0.190 |
| | 1 $sec^{-1}$/1,000 $sec^{-1}$ | 473 | 475 | 460 | 458 | 495 |
| Viscosity change rate | Solid content concentration [mass %] | 0.60 | 0.60 | 0.75 | 0.75 | 0.70 |
| | Viscosity before stirring [mPa · s] | 2,610 | 2,770 | 2,560 | 2,720 | 2,600 |
| | Viscosity after stirring [mPa · s] | 2,020 | 2,160 | 2,500 | 2,600 | 1,990 |
| | Viscosity change rate [%] | −22.6 | −22.0 | −2.3 | −4.4 | −23.5 |
| 0.2% concentration haze [%] | | 12.0 | 12.2 | 4.7 | 4.1 | 5.6 |
| Appearance evaluation of dispersion fluid | | B | B | A | A | A |
| Defoaming performance | | B | B | B | B | B |
| Particle dispersibility | | A | A | C | C | B |
| Coating suitability of paint | | B | B | A | C | B |
| Surface roughness of coating film [μm] | | 0.15 | 0.14 | 0.15 | 0.12 | 0.19 |
| Aggregates of coating film | | A | A | A | A | A |

TABLE 6

| | Comparative Example 1 | Comparative Example 2 | Comparative Example 3 | Comparative Example 4 | Comparative Example 5 | Comparative Example 6 |
|---|---|---|---|---|---|---|
| Substituent | Phosphoric acid group | Phosphoric acid group | Phosphorous acid group | Phosphorous acid group | Phosphoric acid group | Phosphorous acid group |
| Amount of substituent [mmol/g] | 0.80 | 2.00 | 0.74 | 1.86 | 0.80 | 0.74 |

TABLE 6-continued

| | | | | | | | |
|---|---|---|---|---|---|---|---|
| Thixotropy reduction treatment | | Ozone (4.0 × $10^{-2}$ g) | Ozone (1.0 × $10^{-2}$ g) | Ozone (4.0 × $10^{-2}$ g) | Ozone (1.0 × $10^{-2}$ g) | Not performed | Not performed |
| 0.4% by mass viscosity [mPa · s] | | 14 | 5,160 | 12 | 4,950 | 9,600 | 9,450 |
| Polymerization degree | | 146 | 420 | 146 | 410 | 520 | 530 |
| Dispersion fluid concentration [mass %] | | 2.0 | 2.0 | 2.0 | 2.0 | 2.0 | 2.0 |
| Undiluted | 0.3 rpm [mPa · s] | 250,000 | 626,000 | 237,000 | 621,000 | 1,777,000 | 1,769,000 |
| solution viscosity | 3 rpm [mPa · s] | 33,600 | 92,800 | 31,800 | 92,100 | 231,200 | 230,200 |
| (B-type) | 0.3 rpm/3 rpm | 7.44 | 6.75 | 7.45 | 6.74 | 7.69 | 7.68 |
| Undiluted | 1 $sec^{-1}$ [Pa · s] | 24 | 57 | 23 | 57 | 94 | 94 |
| solution viscosity | 1,000 $sec^{-1}$ [Pa · s] | 0.050 | 0.070 | 0.048 | 0.077 | 0.249 | 0.248 |
| (rheometer) | 1 $sec^{-1}$/1,000 $sec^{-1}$ | 480 | 814 | 479 | 740 | 378 | 379 |
| Viscosity change rate | Solid content concentration [mass %] | 2.00 | 0.50 | 2.00 | 0.50 | 0.40 | 0.40 |
| | Viscosity before stirring [mPa · s] | 1,910 | 2,190 | 2,050 | 2,200 | 2,200 | 2,270 |
| | Viscosity after stirring [mPa · s] | 1,000 | 880 | 1,060 | 920 | 680 | 720 |
| | Viscosity change rate [%] | −47.6 | −59.8 | −48.3 | −58.2 | −69.1 | −68.3 |
| 0.2% concentration haze [%] | | 0.5 | 0.4 | 0.7 | 0.4 | 8.5 | 8.9 |
| Appearance evaluation of dispersion fluid | | A | A | A | A | A | A |
| Defoaming performance | | A | C | A | C | D | D |
| Particle dispersibility | | D | A | D | A | A | A |
| Coating suitability of paint | | D | D | D | D | D | D |
| Surface roughness of coating film [μm] | | 0.11 | 0.62 | 0.11 | 0.54 | 0.41 | 0.43 |
| Aggregates of coating film | | A | D | A | D | D | D |

| | | Comparative Example 7 | Comparative Example 8 | Comparative Example 9 | Comparative Example 10 | Comparative Example 11 |
|---|---|---|---|---|---|---|
| Substituent | | Sulfuric acid group | Carboxy group | Phosphoric acid group | Phosphoric acid group | Phosphoric acid group |
| Amount of substituent [mmol/g] | | 0.88 | 0.70 | 2.00 | 2.00 | 0.80 |
| Thixotropy reduction treatment | | Not performed | Not performed | Ozone (2.0 × $10^{-3}$ g) | Enzyme (1.0 × $10^{-5}$ g) | Ozone (4.0 × $10^{-2}$ g) |
| 0.4% by mass viscosity [mPa · s] | | 8,890 | 12,000 | 1,980 | 2,100 | 120 |
| Polymerization degree | | 540 | 532 | 397 | 402 | 600 |
| Dispersion fluid concentration [mass %] | | 2.0 | 2.0 | 2.0 | 2.0 | 12.0 |
| Undiluted | 0.3 rpm [mPa · s] | 1,737,000 | 1,897,000 | 995,000 | 1,013,000 | — |
| solution viscosity | 3 rpm [mPa · s] | 226,200 | 246,300 | 144,600 | 147,100 | — |
| (B-type) | 0.3 rpm/3 rpm | 7.68 | 7.70 | 6.88 | 6.89 | — |
| Undiluted | 1 $sec^{-1}$ [Pa · s] | 92 | 98 | 87 | 88 | — |
| solution viscosity | 1,000 $sec^{-1}$ [Pa · s] | 0.244 | 0.263 | 0.076 | 0.077 | — |
| (rheometer) | 1 $sec^{-1}$/1,000 $sec^{-1}$ | 377 | 373 | 1145 | 1143 | — |
| Viscosity change rate | Solid content concentration [mass %] | 0.40 | 0.40 | 0.60 | 0.60 | |
| | Viscosity before stirring [mPa · s] | 2,500 | 2,420 | 2,440 | 2,380 | — |
| | Viscosity after stirring [mPa · s] | 780 | 620 | 1,780 | 1,780 | — |
| | Viscosity change rate [%] | −68.8 | −74.4 | −27.0 | −25.2 | — |
| 0.2% concentration haze [%] | | 8.0 | 16.5 | 0.6 | 0.5 | 40.0 |
| Appearance evaluation of dispersion fluid | | A | A | A | A | D |
| Defoaming performance | | D | D | C | C | A |
| Particle dispersibility | | A | A | A | A | D |
| Coating suitability of paint | | D | D | C | C | — |
| Surface roughness of coating film [μm] | | 0.41 | 0.47 | 0.40 | 0.40 | — |
| Aggregates of coating film | | D | D | D | D | — |

The microfibrous cellulose obtained in the Examples was excellent in particle dispersibility, and the paint using the same exhibited the excellent coating suitability. Further, when the paint using the microfibrous cellulose obtained in the Examples was used, a coating film having a smooth surface and causing a less generation of aggregates was obtained.

Further, the microfibrous cellulose obtained in the Examples was excellent in transparency of the dispersion fluid, and also exhibited the satisfactory defoaming performance.

The invention claimed is:

1. A fibrous cellulose dispersion liquid obtained by dispersing a fibrous cellulose having a fiber width of 1,000 nm or less and containing an ionic substituent in a solvent containing water, wherein an amount of the ionic substituent in the fibrous cellulose is 0.10 mmol/g or more and 1.50 mmol/g or less, a polymerization degree of the fibrous cellulose is 150 or more and 515 or less, and when the fibrous cellulose is dispersed in a dispersion solvent containing water and isopropanol to obtain a dispersion liquid having a 7:3 mass ratio of water and isopropanol and a viscosity of 2,500 mPa·s at 23° C., and the dispersion liquid is stirred under following stirring conditions, a viscosity change rate falls within ±50% as calculated by following formula:

viscosity change rate (%)=(viscosity after stirring−viscosity before stirring)/viscosity before stirring×100

(stirring conditions)

the dispersion liquid having the viscosity of 2,500 mPa·s at 23° C. is poured into a cylindrical container having a diameter of 10 cm to a height of 5 cm, and is stirred at 23° C. for 24 hours by using an elliptical stirrer having a length of 5 cm, a center width of 2 cm, and an end width of 1 cm, while maintaining a 2 cm-recessed state at a center of a liquid surface, wherein when the dispersion liquid with 0.4% by mass of the fibrous cellulose is formed through dispersion in water, the viscosity of the dispersion liquid at 23° C. is 20 mPa·s or more and 4,700 mPa·s or less, and a polymerization degree of the microfibrous cellulose is 320 or more and 515 or less.

* * * * *